US012739837B2

(12) United States Patent
Xu et al.

(10) Patent No.: US 12,739,837 B2

(45) Date of Patent: Sep. 15, 2026

(54) METHOD AND APPARATUS FOR TRANSMITTING UPLINK FEEDBACK INFORMATION

(71) Applicant: GUANGDONG OPPO MOBILE TELECOMMUNICATIONS CORP., LTD., Dongguan (CN)

(72) Inventors: Jing Xu, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 316 days.

(21) Appl. No.: 18/405,584

(22) Filed: Jan. 5, 2024

(65) Prior Publication Data

US 2024/0163877 A1 May 16, 2024

Related U.S. Application Data

(63) Continuation of application No. PCT/CN2021/105064, filed on Jul. 7, 2021.

(51) Int. Cl.

| | |
|---|---|
| ***H04W 72/21*** | (2023.01) |
| ***H04L 1/1812*** | (2023.01) |
| ***H04W 72/0446*** | (2023.01) |
| ***H04W 72/11*** | (2023.01) |

(52) U.S. Cl.

CPC .......... *H04W 72/21* (2023.01); *H04L 1/1812* (2013.01); *H04W 72/0446* (2013.01); *H04W 72/11* (2023.01)

(58) Field of Classification Search

CPC ... H04L 1/1812; H04L 1/1854; H04L 1/1861; H04W 72/21; H04W 72/04; H04W 72/0446; H04W 72/11

See application file for complete search history.

(56) References Cited

U.S. PATENT DOCUMENTS

2023/0122250 A1* 4/2023 Lin ..................... H10D 62/118 257/401
2023/0247649 A1* 8/2023 Takahashi ............ H04L 1/1607 370/329

(Continued)

FOREIGN PATENT DOCUMENTS

CN 109152053 A 1/2019
CN 110830204 A 2/2020

(Continued)

OTHER PUBLICATIONS

CATT, "UE Feedback Enhancements for HARQ-ACK", 3GPP TSG RAN WG1 #104b-e R1-2102628, Apr. 7, 2021 (Apr. 7, 2021), section 2.1, and figure 3. 11 pages.

(Continued)

*Primary Examiner* — Brian D Nguyen

(74) *Attorney, Agent, or Firm* — Ladas & Parry LLP

(57) ABSTRACT

Provided are a method and apparatus for transmitting uplink feedback information. The method includes: a terminal determines a first PUCCH resource in a first time-domain unit, the first PUCCH resource being configured for carrying multiple SPS HARQ-ACKs, and the multiple SPS HARQ-ACKs including at least one SPS HARQ-ACK in a first SPS HARQ-ACK set and at least one SPS HARQ-ACK in a second SPS HARQ-ACK set; and when the first PUCCH resource is unavailable, the terminal determines whether the first time-domain unit is a time-domain unit for transmitting the first SPS HARQ-ACK set.

15 Claims, 3 Drawing Sheets

(56) References Cited

U.S. PATENT DOCUMENTS

| | | | | |
|---|---|---|---|---|
| 2023/0269731 A1* | 8/2023 | Takahashi | H04W 72/1263 | 370/329 |
| 2023/0276459 A1* | 8/2023 | Ouchi | H04L 1/1854 | 370/329 |
| 2023/0337238 A1* | 10/2023 | Takahashi | H04W 72/21 | |
| 2023/0361938 A1* | 11/2023 | He | H04W 72/232 | |
| 2024/0057175 A1* | 2/2024 | Kumagai | H04W 74/006 | |
| 2024/0172287 A1* | 5/2024 | Su | H04W 72/23 | |
| 2024/0291594 A1* | 8/2024 | Zhang | H04L 5/0096 | |

FOREIGN PATENT DOCUMENTS

| | | |
|---|---|---|
| WO | 2021056135 A1 | 4/2021 |
| WO | 2021062804 A1 | 4/2021 |

OTHER PUBLICATIONS

CATT, "UE Feedback Enhancements for HARQ-ACK", 3GPP TSG RAN WGI #104-e R1-2100376, Jan. 19, 2021 (Jan. 19, 2021), section 2.1. 10 pages.

International Search Report in the international application No. PCT/CN2021/105064, mailed on Mar. 23, 2022. 7 pages with English translation.

Written Opinion of the International Search Authority in the international application No. PCT/CN2021/105064, mailed on Apr. 13, 2022. 8 pages with English translation.

MCC Support, "Final Report of 3GPP TSG RAN WG1 #104bis-e v1.0.0 (Online meeting, Apr. 12-20, 2021)", 3GPP TSG RAN WG1 Meeting #105-e R1-2104151, e-Meeting, May 10-27, 2021, section 8.3.1.1. 141 pages.

* cited by examiner

METHOD AND APPARATUS FOR TRANSMITTING UPLINK FEEDBACK INFORMATION

CROSS-REFERENCE TO RELATED APPLICATION

This is a continuation of International Application No. PCT/CN2021/105064 filed on Jul. 7, 2021, the entire contents of which are hereby incorporated herein by reference in its entirety.

BACKGROUND

Semi-persistent scheduling (SPS) is a scheduling mode for periodically preconfiguring transmission resources. In the scheduling mode, a terminal may perform data transmission periodically using preconfigured resources without any downlink (DL) grant scheduling.

A terminal may report to a network device an SPS hybrid automatic repeat reQuest acknowledgment (HARQ-ACK) corresponding to SPS downlink data sent by the network device. If the network device sends multiple SPS downlink data to the terminal, the terminal needs to report multiple SPS HARQ-ACKs corresponding to the multiple SPS downlink data to the network device, which may cause a case that multiple SPS HARQ-ACKs may be reported in one time-domain unit. In this case, an urgent problem to be solved is how to transmit the multiple SPS HARQ-ACKs to improve system efficiency.

SUMMARY

The disclosure relates to the field of communication, and provides a method and apparatus for transmitting uplink feedback information, capable of improving system efficiency.

In a first aspect, a method for transmitting uplink feedback information is provided. The method includes the following operations. A terminal determines a first physical uplink control channel (PUCCH) resource in a first time-domain unit. The first PUCCH resource is configured for carrying multiple semi-persistent scheduling (SPS) hybrid automatic repeat reQuest acknowledgments (HARQ-ACKs), and the multiple SPS HARQ-ACKs include at least one SPS HARQ-ACK in a first SPS HARQ-ACK set and at least one SPS HARQ-ACK in a second SPS HARQ-ACK set. The terminal determines whether the first time-domain unit is a time-domain unit for transmitting the first SPS HARQ-ACK set in response to the first PUCCH resource being unavailable.

In a second aspect, a method for transmitting uplink feedback information is provided. The method includes the following operations. A network device determines a first PUCCH resource in a first time-domain unit. The first PUCCH resource is configured for carrying multiple SPS HARQ-ACKs, and the multiple SPS HARQ-ACKs include at least one SPS HARQ-ACK in a first SPS HARQ-ACK set and at least one SPS HARQ-ACK in a second SPS HARQ-ACK set. The network device determines whether the first time-domain unit is a time-domain unit for receiving the first SPS HARQ-ACK set in response to the first PUCCH resource being unavailable.

In a third aspect, a terminal is provided. The terminal includes a first determining unit and a second determining unit. The first determining unit may be configured to determine a first PUCCH resource in a first time-domain unit. The first PUCCH resource is configured for carrying multiple SPS HARQ-ACKs. The multiple SPS HARQ-ACKs include at least one SPS HARQ-ACK in a first SPS HARQ-ACK set and at least one SPS HARQ-ACK in a second SPS HARQ-ACK set. The second determining unit may be configured to determine, in response to the first PUCCH resource being unavailable, whether the first time-domain unit is a time-domain unit for transmitting the first SPS HARQ-ACK set.

In a fourth aspect, a network device is provided. The network device includes a first determining unit and a second determining unit. The first determining unit may be configured to determine a first PUCCH resource in a first time-domain unit. The first PUCCH resource is configured for carrying multiple SPS HARQ-ACKs. The multiple SPS HARQ-ACKs include at least one SPS HARQ-ACK in a first SPS HARQ-ACK set and at least one SPS HARQ-ACK in a second SPS HARQ-ACK set. The second determining unit may be configured to determine, in response to the first PUCCH resource being unavailable, whether the first time-domain unit is a time-domain unit for receiving the first SPS HARQ-ACK set.

In a fifth aspect, a terminal is provided. The terminal may include a memory and a processor. The memory may be configured to store a program. The processor may be configured to call the program in the memory to implement the method of the first aspect.

In a sixth aspect, a network device is provided. The network device may include a memory and a processor. The memory may be configured to store a program. The processor may be configured to call the program in the memory to implement the method of the second aspect.

In a seventh aspect, an apparatus is provided. The apparatus may include a processor configured to call a program in a memory to implement the method of the first aspect.

In an eighth aspect, an apparatus is provided. The apparatus may include a processor configured to call a program in a memory to implement the method of the second aspect.

In a ninth aspect, a chip is provided. The chip may include a processor configured to call a program in a memory, to cause a device installed with the chip to implement the method of the first aspect.

In a tenth aspect, a chip is provided. The chip may include a processor configured to call a program in a memory, to cause a device installed with the chip to implement the method of the second aspect.

In an eleventh aspect, a computer-readable storage medium is provided. The computer-readable storage medium has stored thereon a program, and the program causes a computer to implement the method of the first aspect.

In a twelfth aspect, a computer-readable storage medium is provided. The computer-readable storage medium has stored thereon a program, and the program causes a computer to implement the method of the second aspect.

In a thirteenth aspect, a computer program product is provided. The computer program product includes a program, and the program causes a computer to implement the method of the first aspect.

In a fourteenth aspect, a computer program product is provided. The computer program product includes a program, and the program causes a computer to implement the method of the second aspect.

In a fifteenth aspect, a computer program is provided. The computer program may cause a computer to implement the method of the first aspect.

In a sixteenth aspect, a computer program is provided. The computer program may cause a computer to implement the method of the second aspect.

Based on the above technical solutions, in the embodiments of the disclosure, when the first PUCCH resource for carrying the multiple SPS HARQ-ACKs in the first time-domain unit is unavailable, the multiple SPS HARQ-ACKs may be classified such as into any SPS HARQ-ACK in the first SPS HARQ-ACK set and any SPS HARQ-ACK in the second SPS HARQ-ACK set. Further, the terminal may determine whether the first time-domain unit is a time-domain unit for transmitting the first SPS HARQ-ACK set. That is, by determining whether part of the multiple SPS HARQ-ACKs may be transmitted in the first time-domain unit, the transmission opportunity of the SPS HARQ-ACK may be increased, thereby providing the network side with necessary SPS HARQ-ACK information and improving system efficiency.

BRIEF DESCRIPTION OF THE DRAWINGS

FIG. 1 is a schematic diagram of a wireless communication system 100 to which embodiments of the disclosure are applied.

FIG. 2 is a schematic diagram of deferring SPS HARQ-ACK transmission.

FIG. 3 is a schematic flowchart of a method for transmitting uplink feedback information according to an embodiment of the disclosure.

DETAILED DESCRIPTION

Figure 4:
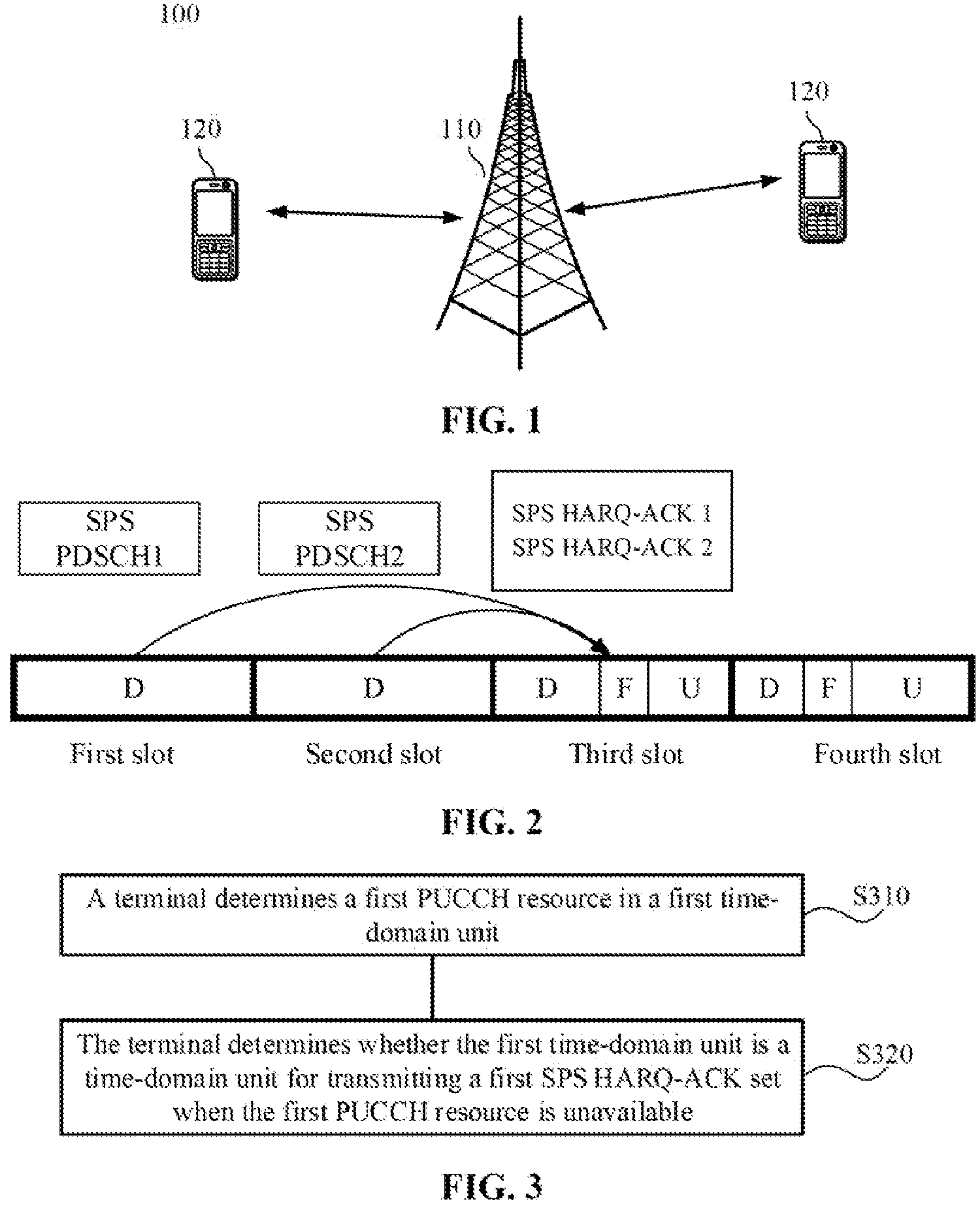
FIG. 4 is a schematic diagram of determining a time-domain unit for transmitting a first SPS HARQ-ACK set and a second SPS HARQ-ACK set according to an embodiment of the disclosure.

Technical solutions in the disclosure are described hereinafter with reference to the drawings.

FIG. 1 is a wireless communication system 100 to which embodiments of the disclosure are applied. The wireless communication system 100 may include a network device 110 and a terminal device 120. The network device 110 may be a device communicating with the terminal device 120. The network device 110 may provide communication coverage for a specific geographical region, and may communicate with the terminal device 120 in the coverage.

FIG. 1 exemplarily illustrates one network device and two terminals. In an example, the wireless communication system 100 may include multiple network devices, and each network device may cover another number of terminal devices, which is not limited in embodiments of the disclosure.

In an example, the wireless communication system 100 may further include another network entity such as a network controller, a mobile management entity (MME), etc., which is not limited in embodiments of the disclosure.

It is to be understood that technical solutions of the embodiments of the disclosure may be applied to various communication systems, for example, a 5th generation (5G) system or a new radio (NR) system, a long term evolution (LTE) system, an LTE frequency division duplex (FDD) system, LTE time division duplex (TDD), etc. The technical solutions of the embodiments of the disclosure may be applied to a future communication system such as a sixth generation mobile communication system, a satellite communication system, etc.

The terminal device according to embodiments of the disclosure may also be referred to as a user equipment (UE), an access terminal, a user unit, a user station, a mobile radio station, a mobile station (MS), a mobile terminal (MT), a remote station, a remote terminal, a mobile device, a user terminal, a terminal, a wireless communication device, a user agent, or a user device. The terminal device according to embodiments of the disclosure may refer to a device providing a user with voice and/or data connectivity, and may be configured to connect people, things, and machines, such as a handheld device with a wireless communication function, an on-board device or the like. The terminal device according to embodiments of the disclosure may be a mobile phone, a tablet computer (Pad), a notebook computer, a palm computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, etc. In an example, a UE may be used as a base station. For example, the UE may serve as a scheduling entity for providing a sidelink (SL) signal between UEs in vehicle-to-everything (V2X) communication or device-to-device (D2D) communication, etc. For example, a cell phone and a vehicle communicate with each other using a sidelink (SL) signal. A cell phone may communicate with a smart home device, without the need to relay a communication signal through a base station.

The network device according to embodiments of the disclosure may be a device configured to communicate with a terminal device. The network device may also be referred to as an access network device or a radio access network (RAN) device. For example, the network device may be a base station. The network device according to embodiments of the disclosure may refer to a radio access network (RAN) node (or device) that connects a terminal device to a wireless network. The base station may in general cover (or be replaced with) various names such as: a node B (NodeB), an evolved NodeB (eNB), a next generation NodeB (gNB), a relay, an access point (AP), a transmitting and receiving point (TRP), a transmitting point (TP), a master eNodeB (MeNB), a secondary eNodeB (SeNB), a multi-standard radio (MSR) node, a home NodeB, a network controller, an access node, a wireless node, an access point (AP), a transmitting node, a transmitting and receiving node, a base band unit (BBU), a remote radio unit (RRU), an active antenna unit (AAU), a remote radio head (RRH), a central unit (CU), a distributed unit (DU), a positioning node, etc. The base station may be a macro NodeB, a micro NodeB, a relay node, a donor node, or the like, or a combination of the any listed item. The base station may further refer to a communication module, a modem, or a chip provided in a foregoing device or apparatus. The base station may further be a mobile switching center, a device serving as a base station in device-to-device D2D communication, vehicle-to-everything (V2X) communication, and machine-to-machine (M2M) communication, a network-side device in a 6G network, a device serving as a base station in a future communication system, etc. The base station may support networks of identical or different access technologies. A specific technology and a specific device form adopted by a network device are not limited in the embodiments of the disclosure.

The base station may be fixed or mobile. For example, a helicopter or an unmanned aerial vehicle (UAV) may serve as a mobile base station. One or more cells may move according to the location of the mobile base station. In another example, a helicopter or a UAV may serve as a device communicating with another base station.

In some deployment, the network device according to embodiments of the disclosure may refer to a CU or a DU. Alternatively, the network device may include a CU and a DU. A gNB may further include an AAU.

A network device and a terminal device may be deployed on land, including indoor or outdoor, handheld, or onboard, deployed on water, or deployed on an airborne aircraft, balloon, satellite, etc. The scenarios in which the network device and terminal device are deployed are not limited in the embodiments of the disclosure.

It is to be understood that a communication device involved in the disclosure may be a network device or a terminal device. For example, a first communication device may be a network device, and a second communication device may be a terminal device. In another example, the first communication device may be a terminal device, and the second communication device may be a network device. In another example, the first communication device and the second communication device may both be network devices, or both be terminal devices.

It is to be understood that that all or some functions of the communication device in the disclosure may also be implemented through a software function run on hardware, or through a virtual function instantiated on a platform (such as a cloud platform).

A communication system may adopt a frame structure. One frame has a time length of 10 ms. One radio frame includes 10 subframes, and each subframe has a time length of 1 ms. 5 subframes forms one half-frame. Subframes with numberings 0-4 and subframes with numberings 5-9 may be located in different half-frames.

Take an NR system as an example. The number of slots included in a subframe in NR may depend on a subcarrier spacing. Different subcarrier spacings correspond to different slot lengths. One slot in a normal cyclic prefix (CP) configuration may include 14 orthogonal frequency division multiplexing (OFDM) symbols. One slot in an extended CP configuration may include 12 OFDM symbols. Therefore, different subcarrier spacings may also correspond to different OFDM symbol lengths. An NR system may support a subcarrier spacing such as 15 kHz, 30 kHz, 60 kHz, 120 kHz, 240 kHz, 480 kHz, etc. If the subcarrier spacing is 15 kHz, one subframe may include one slot, and an OFDM symbol may have a length of 66.67 μs. If the subcarrier spacing is 30 kHz, one subframe may include two slots, and an OFDM symbol may have a length of 33.33 μs.

In addition, taking an NR system as an example, uplink and downlink configuration may be performed on a slot in the NR system. The uplink and downlink configuration in the NR system may be performed at a symbol granularity, allowing more flexible configuration. Symbols in each slot may be divided into three types of symbols, i.e., an uplink symbol, a downlink symbol, and a flexible symbol. An uplink symbol may be configured for uplink data transmission. A downlink symbol may be configured for downlink data transmission. A flexible symbol may be configured for downlink data transmission or uplink data transmission according to actual scheduling of a network device. That is, the direction of the transmission on a flexible symbol is not fixed.

The uplink and downlink configuration may be semi-static or dynamic.

In semi-static uplink and downlink configuration, taking an NR system as an example, in the NR system, a frame structure may be configured based on a period. There may be just one downlink to uplink transition point in each period, so as to ensure downlink resource continuity and uplink resource continuity in each period. A period of the frame structure in the NR system may be 0.5 ms, 0.625 ms, 1 ms, 1.25 ms, 2 ms, 2.5 ms, 5 ms, 10 ms, etc. A network device may provide a terminal with one or more configuration parameters. The configuration parameters may include a subcarrier spacing u and a pattern 1. The pattern 1 may include a slot configuration period P, the number D1 of downlink slots, the number D2 of downlink symbols, the number UL of uplink slots, the number U2 of uplink symbols, etc. The number of slots included in one period may be obtained according to the formula S=P*2u. S denotes the number of slots. The first D1 slots in the S slots are downlink slots, followed by D2 downlink symbols, then any flexible symbol, then U2 uplink symbols, and finally U1 uplink slots.

Dynamic uplink and downlink configuration may be indicated through downlink control information (DCI). A frame structure may be configured by indicating slot format information (SFI) using dynamic DCI in a DCI format 2_0, or, by scheduling transmission of uplink data or downlink data in a DCI format 0_0/0_1/0_2/1_0/1_1/1_2. The frame structure is not changed directly by the data scheduling mode. However, the direction of transmission on a scheduled symbol is given implicitly by scheduling transmission of uplink data or downlink data via DCI.

A network device may perform scheduling for a terminal dynamically or semi-statically. Dynamic scheduling is the most basic, most flexible scheduling mode. The resource allocation is based on an on-demand allocation mode, and each scheduling requires interaction between scheduling signalling. The terminal may determine a transmission resource scheduled by scheduling signalling sent by the network device through receiving the scheduling signalling, and receive or send data on the transmission resource. In semi-static scheduling, the network device may perform scheduling just when a resource is allocated for the first time, such that a semi-static resource, such as a physical downlink shared channel (PDSCH) resource and/or a physical uplink shared channel (PUSCH) resource, may be allocated to the terminal periodically. The terminal may receive and/or send data using the semi-static resource every period, and the network device does not need to send scheduling signalling again to designate the allocated resource, such that one allocation is used for multiple times.

In the embodiments of the disclosure, multiple SPS configurations may be introduced. The network device may allocate different time-domain resources and different frequency domain resources to respective SPS configurations. For example, an SPS configuration allocated to an ultra reliable and low latency communication (URLLC) service may indicate a small interval. An SPS configuration allocated to an enhanced mobile broadband (eMBB) service may indicate a large interval. Of course, the network device may also allocate multiple SPS configurations to the same service, which is not limited specifically in the embodiments of the disclosure.

For semi-static scheduled data, such as an SPS PDSCH sent by the network device to the terminal, the terminal need to report/feed back an SPS HARQ-ACK corresponding to the SPS PDSCH to the network device. The network device may determine whether to repeat the data based on the SPS HARQ-ACK sent by the terminal. For example, the network device may repeat transmission of the SPS PDSCH to the terminal device if the network device receives negative acknowledgement (NACK) feedback sent by the terminal. The network device does not repeat transmission of the SPS PDSCH to the terminal if the network device receives acknowledgement (ACK) feedback sent by the terminal. The network device may send multiple SPS PDSCHs to the terminal. The terminal may send multiple SPS HARQ-ACKs corresponding to the multiple SPS PDSCHs to the network device. Thus, one time-domain unit may include multiple SPS HARQ-ACKs. In this case, how to transmit multiple SPS HARQ-ACKs to improve system efficiency becomes an urgent problem to be solved.

In addition, due to uplink and downlink configuration of the frame structure, the terminal can send an SPS HARQ-ACK only on an uplink symbol and/or a flexible symbol. Therefore, to ensure that the terminal sends a SPS HARQ-ACK successfully, the network device may configure certain SPS HARQ-ACK deferral for the terminal device. For example, the network device may configure one or more parameters such as K1 and/or $K1_{def}$, etc., through PDSCH-HARQ-ACK (also referred to as PDSCH-to-HARQ-ACK) timing, to inform the terminal of a time-domain unit for transmitting an SPS HARQ-ACK. Both K1 and $K1_{def}$ may be positive integers. For example, K1 is any one of integers 1~8. K1 denotes feedback timing. $K1_{def}$ denotes a deferral upper limit. In an example, the feedback timing K1 may also be deemed as a PDSCH-HARQ-ACK timing. That is, an interval between a time-domain unit in which the network device sends an SPS PDSCH and a time-domain unit in which the terminal reports an SPS HARQ-ACK may be $\{K1, K1+K1_{def}\}$; time-domain units. The limit on the maximum deferral of SPS HARQ is defined in terms of $K1_{eff}=K1+K1_{def}$. The terminal may determine, according to K1, a time-domain unit in which an SPS HARQ-ACK may be fed back for the first time. The terminal may determine the upper limit of deferring SPS HARQ-ACK feedback according to K1 and $K1_{def}$. Assuming that the network device sends an SPS PDSCH to the terminal in an m-th time-domain unit, the terminal may report an SPS HARQ-ACK for the first time in an (m+K1)-th time-domain unit, and the upper limit of the time-domain unit in which the terminal may defer SPS HARQ-ACK feedback is an $(m+K1+K1_{def})$-th time-domain unit.

In the embodiments of the disclosure, an SPS HARQ-ACK in the (m+K1)-th time-domain unit may denote an SPS HARQ-ACK transmitted in the (m+K1)-th time-domain unit determined according to K1. For ease of description, such SPS HARQ-ACK may be referred to hereinafter as an SPS HARQ-ACK without deferral for short. An $\{m+K1+1, m+K1+K1_{def}\}$-th time-domain unit may denote a time-domain unit reached after deferral from the time-domain unit determined according to K1. For ease of description, an SPS HARQ-ACK transmitted in the $\{m+K1+1, m+K1+K1_{def}\}$th time-domain unit may be referred to hereinafter as a deferred SPS HARQ-ACK. An SPS HARQ-ACK transmitted in the $(m+K1, m+K1+K1_{def}-1)$-th time-domain unit may denote an SPS HARQ-ACK deferred by a duration reaching the upper limit, or a nondeferrable SPS HARQ-ACK. An SPS HARQ-ACK transmitted in the $\{m+K1, m+K1+K1_{def}-1\}$-th time-domain unit may denote a deferrable SPS HARQ-ACK.

K1 and/or $K1_{def}$ configured for different SPS HARQ-ACKs may be the same or different.

SPS HARQ-ACK deferral may be configured in two modes. One mode is joint radio resource control (RRC) configuration of the SPS HARQ-ACK deferral per physical uplink control channel (PUCCH) cell group. In this case, any SPS HARQ-ACK within a PUCCH cell group in principle is subject to deferral. In the other mode, the SPS HARQ-ACK deferral is configured per SPS configuration. In this case, part of SPS configuration sps-config, only HARQ-ACK of SPS PDSCH configurations configured for deferral is in principle subject to deferral.

In the case that the SPS HARQ-ACK deferral is configured per PUCCH cell group, if the network device configures SPS HARQ-ACK deferral for a PUCCH cell group, all SPS configurations in the PUCCH cell group need the SPS HARQ-ACK deferral. SPS HARQ-ACK deferral is unnecessary for some SPS configurations. On one hand, different services have different transmission latency requirements. It is possible that SPS HARQ-ACK feedback has failed to meet the service latency requirement, and the SPS HARQ-ACK information is meaningless for HARQ retransmission. On the other hand, SPS HARQ-ACK feedback consumes more transmitting power of the terminal, and redundant SPS HARQ-ACK feedback may bring unnecessary uplink power consumption.

In the case that the SPS HARQ-ACK deferral is configured per SPS configuration, the network device may configure separate SPS HARQ-ACK deferral for each SPS configuration, which is more flexible and may adapt to the requirement of each SPS configuration. For example, the network device configures long SPS HARQ-ACK deferral for some SPS configurations, and configures short SPS HARQ-ACK deferral for some SPS configurations. Of course, the network device may configure no SPS HARQ-ACK deferral for some SPS configurations. That is, an SPS HARQ-ACK for the SPS configuration may be transmitted only in a certain time-domain unit, and may not be deferred to the next time-domain unit. In this case, one time-domain unit may include multiple SPS HARQ-ACKs for different SPS configurations. Some of the multiple SPS HARQ-ACKs may be deferred, and some may not be deferred.

In addition, as there is an upper limit for SPS HARQ-ACK deferral, the time-domain unit for transmitting the initial SPS HARQ-ACK feedback or the upper limit for SPS HARQ-ACK deferral may differ for different SPS configurations. It may occur that some of SPS HARQ-ACKs in one time-domain unit may continue to be deferred, and some may not be deferred. Alternatively, it may occur that some of SPS HARQ-ACKs in one time-domain unit may have been deferred, while some may not have been deferred.

For example, in FIG. 2, taking a time-domain unit being a slot as an example, the network device sends SPS PDSCH 1 to the terminal in a first downlink slot, and sends SPS PDSCH 2 to the terminal in a second downlink slot. For SPS PDSCH 1 and SPS PDSCH 2, the feedback timing K1 is 1, and the deferral upper limit $K1_{def}$ is 1. The terminal may send SPS HARQ-ACK 1 corresponding to the SPS PDSCH 1 to the network device in the second slot and the third slot.

The terminal may send SPS HARQ-ACK 2 corresponding to the SPS PDSCH 2 to the network device in the third slot and the fourth slot. As the second slot is a downlink slot, the terminal may defer transmission of the SPS HARQ-ACK 1 until the third slot. In this case, for the third slot, the SPS HARQ-ACK 1 is a nondeferrable SPS HARQ-ACK, and the SPS HARQ-ACK 2 is a deferrable SPS HARQ-ACK. Alternatively, for the third slot, the SPS HARQ-ACK 1 is a deferred SPS HARQ-ACK, and the SPS HARQ-ACK 2 is an SPS HARQ-ACK without deferral (i.e., an SPS HARQ-ACK that has not been deferred).

When multiple SPS HARQ-ACK are included in one time-domain unit, how to transmit the multiple SPS HARQ-ACKs to improve system efficiency becomes an urgent problem to be solved.

To address the above problems, technical solutions according to the embodiments of the disclosure are elaborated hereinafter from the angle of the terminal with reference to FIG. 3. FIG. 3 is a schematic flowchart of a method for transmitting uplink feedback information according to an embodiment of the disclosure. The method as illustrated in FIG. 3 includes operations at S310 to S320.

At S310, a terminal determines a first physical uplink control channel (PUCCH) resource in a first time-domain unit. The first time-domain unit may be any time-domain unit. For example, the first time-domain unit is any time-domain unit in which multiple SPS HARQ-ACKs are to be transmitted.

The first PUCCH resource may be used for carrying multiple SPS HARQ-ACKs. The multiple SPS HARQ-ACKs may be feedbacks for multiple SPS PDSCHs. The multiple SPS HARQ-ACKs are SPS HARQ-ACKs that need to be transmitted in the same time-domain unit (i.e., the first time-domain unit). That is, the first PUCCH resource may be a resource on the first time-domain unit. The first PUCCH resource may occupy the entire first time-domain unit, or the first PUCCH resource may include some OFDM symbols on the first time-domain unit.

The terminal may determine multiple SPS HARQ-ACKs to be transmitted in the first time-domain unit according to the first time-domain unit. The multiple SPS HARQ-ACKs may be determined according to the foregoing parameters such as K1 and/or $K1_{def}$, etc. Referring to FIG. 2, for example, assuming that the first time-domain unit is the third slot, the network device sends SPS PDSCH 1 to the terminal in the first slot, and feedback parameters for the SPS PDSCH 1 may be K1=1 and $K1_{def}$. Then, SPS HARQ-ACK 1 corresponding to the SPS PDSCH 1 may be transmitted in the second slot and the third slot. Therefore, the SPS HARQ-ACK 1 corresponding to the SPS PDSCH 1 may need to be transmitted in the first time-domain unit (that is, the third slot). Similarly, a time-domain unit for transmitting an SPS HARQ-ACK corresponding to another SPS PDSCH may also be determined in this way. The terminal may determine the multiple SPS HARQ-ACKs to be transmitted in the first time-domain unit (i.e., SPS HARQ-ACKs to be transmitted in the first time-domain unit) through the above operations.

A time-domain unit according to the embodiments of the disclosure may be a time-domain unit of any time granularity. For example, the time-domain unit may be a slot, a subslot, a time-domain unit including any number of OFDM symbols, etc. A slot may be a slot as described above. The length of the slot may be determined according to the subcarrier spacing. One slot may include 14 OFDM symbols. A subslot may be a time-domain unit of a time granularity smaller than the time granularity of the slot. That is, OFDM symbols included in one subslot may are less than 14. For example, one subslot may include 2 OFDM symbols. In another example, one subslot may include 7 OFDM symbols.

The multiple SPS HARQ-ACKs may include at least one SPS HARQ-ACK in a first SPS HARQ-ACK set and at least one SPS HARQ-ACK in a second SPS HARQ-ACK set. An SPS HARQ-ACK in the first SPS HARQ-ACK set, as well as an SPS HARQ-ACK in the second SPS HARQ-ACK set, may be determined according to at least one of: whether SPS HARQ-ACK deferral being configured for the SPS HARQ-ACK; whether the terminal supports the SPS HARQ-ACK deferral; or, whether a deferral duration of the SPS HARQ-ACK reaching an upper limit.

A mode of classifying SPS HARQ-ACKs into the first SPS HARQ-ACK set and the second SPS HARQ-ACK set is not limited in the embodiments of the disclosure. For example, SPS HARQ-ACKs are classified according to whether an SPS HARQ-ACK is deferrable. The first SPS HARQ-ACK set includes at least one nondeferrable SPS HARQ-ACK, and the second SPS HARQ-ACK set includes at least one deferrable SPS HARQ-ACK. In another example, SPS HARQ-ACKs are classified according to whether an SPS HARQ-ACK has been deferred. The first SPS HARQ-ACK set includes at least one deferred SPS HARQ-ACK, and the second SPS HARQ-ACK set includes at least one SPS HARQ-ACK that has not been deferred. In yet another example, the first SPS HARQ-ACK set includes a nondeferrable SPS HARQ-ACK and/or a deferred SPS HARQ-ACK, and the second SPS HARQ-ACK set includes a deferrable SPS HARQ-ACK or a SPS HARQ-ACK without deferral.

For example, at least one nondeferrable SPS HARQ-ACK includes an SPS HARQ-ACK without SPS HARQ-ACK deferral and/or an SPS HARQ-ACK with a deferral duration reaching an upper limit. That is, the first SPS HARQ-ACK set may include an SPS HARQ-ACK(s) without SPS HARQ-ACK deferral and/or an SPS HARQ-ACK(s) with a deferral duration reaching an upper limit. For example, a deferrable SPS HARQ-ACK includes an SPS HARQ-ACK configured with SPS HARQ-ACK deferral and having a deferral duration not reaching the upper limit. That is, the second SPS HARQ-ACK set may include at least one SPS HARQ-ACK configured with SPS HARQ-ACK deferral and having a deferral duration not reaching the upper limit.

A deferred SPS HARQ-ACK may denote an SPS HARQ-ACK that is determined according to K1 and deferred. An SPS HARQ-ACK without deferral may denote an SPS HARQ-ACK determined directly according to K1. This is illustrated taking FIG. 2 as an example. Assuming that the network device sends SPS PDSCH 1 to the terminal in the first slot. Feedback parameters for the SPS PDSCH 1 may be K1=1 and $K1_{def}$=2, and a slot determined directly according to K1 is the second slot. The network device sends SPS PDSCH 2 to the terminal in the second slot. Feedback parameters for the SPS PDSCH 2 may be K1=1 and $K1_{def}$=1, and a slot determined directly according to K1 is the third slot. Assuming that the first time-domain unit is the third slot. For SPS HARQ-ACK 1, the third slot is a slot deferred from the second slot that is determined directly according to K1. Therefore, the SPS HARQ-ACK 1 may be a deferred SPS HARQ-ACK in the third slot. For SPS HARQ-ACK 2, the third slot may be a slot determined directly according to K1. Therefore, the SPS HARQ-ACK 2 may be an SPS HARQ-ACK without deferral in the third slot. Assuming that the first time-domain unit is the fourth slot. For SPS HARQ-ACK 1, the fourth slot is a slot deferred from the second slot that is determined directly according to K1. Therefore, the SPS HARQ-ACK 1 may be a deferred SPS HARQ-ACK in the fourth slot. For SPS HARQ-ACK 2, the fourth slot may be a slot deferred from the third slot that is determined directly according to K1. Therefore, the SPS HARQ-ACK 2 may be a deferred SPS HARQ-ACK in the fourth slot.

In the embodiments of the disclosure, it is further considered whether the terminal supports SPS HARQ-ACK deferral when determining the first SPS HARQ-ACK set and the second SPS HARQ-ACK set. If the terminal does not support SPS HARQ-ACK deferral, the terminal does not defer any SPS HARQ-ACK. In this case, the multiple SPS HARQ-ACKs may include just SPS HARQ-ACKs in the first SPS HARQ-ACK set. If the terminal supports SPS HARQ-ACK deferral, the terminal may determine the first SPS HARQ-ACK set and the second SPS HARQ-ACK set according to whether SPS HARQ-ACK deferral is configured for an SPS HARQ-ACK and/or whether a deferral duration of an SPS HARQ-ACK reaches an upper limit.

The terminal may determine the first PUCCH resource in multiple modes. The terminal may determine the first PUCCH resource according to the multiple SPS HARQ-ACKs and/or a dynamic HARQ-ACK to be transmitted in the first time-domain unit. In other words, the first PUCCH resource may be determined based on the multiple SPS HARQ-ACKs and/or the dynamic HARQ-ACK to be transmitted in the first time-domain unit. The terminal may perform SPS HARQ-ACK deferral before or after multiplexing the multiple SPS HARQ-ACKs and the dynamic HARQ-ACK. For example, when SPS HARQ-ACK deferral is performed before multiplexing the multiple SPS HARQ-ACKs and the dynamic HARQ-ACK, the terminal may determine the first PUCCH resource according to the multiple SPS HARQ-ACKs. In other words, the first PUCCH resource may be determined based on the multiple SPS HARQ-ACKs. In another example, when SPS HARQ-ACK deferral is performed after multiplexing the multiple SPS HARQ-ACKs and the dynamic HARQ-ACK, the terminal may determine the first PUCCH resource according to both the dynamic HARQ-ACK to be transmitted in the first time-domain unit and the multiple SPS HARQ-ACKs. In other words, the first PUCCH resource may be determined based on both the multiple SPS HARQ-ACKs and the dynamic HARQ-ACK to be transmitted in the first time-domain unit. This is elaborated hereinafter with reference to a specific case.

At S320, the terminal determines whether the first time-domain unit is a time-domain unit for transmitting the first SPS HARQ-ACK set when the first PUCCH resource is unavailable. Whether the first time-domain unit is a time-domain unit for transmitting the first SPS HARQ-ACK set may be understood as whether the first time-domain unit is a time-domain unit for sending the first SPS HARQ-ACK set.

In the embodiments of the disclosure, a PUCCH resource may be available or unavailable. A PUCCH resource being available indicates that the PUCCH resource is available for transmission. A PUCCH resource being unavailable indicates that the PUCCH is unavailable for transmission. A PUCCH resource is unavailable if the PUCCH resource meets at least one of the following: symbols corresponding to the PUCCH resource include a semi-static downlink symbol, the symbols corresponding to the PUCCH resource include a symbol where a synchronization signal block (SSB) is located, or the symbols corresponding to the PUCCH resource include a symbol where control resource set (CORESET) 0 is located. That is, a PUCCH resource may be determined to be unavailable as long as the PUCCH resource meets any of the above conditions. If a PUCCH resource includes no semi-static downlink symbol, no symbol carrying the SSB, and no symbol carrying the CORESET 0, the PUCCH resource may be determined to be available. The PUCCH resource here may be any one PUCCH resource in the embodiments of the disclosure. For example, the PUCCH resource includes at least one of the first PUCCH resource, a second PUCCH resource, or a third PUCCH resource.

The semi-static downlink symbol may be a downlink symbol configured for the frame structure by the network device through semi-static downlink configuration. The transmission direction of the semi-static downlink symbol is in general unchanged. The transmission direction of the flexible symbol may be indicated by the network device through DCI. If the network device instructs to use a flexible symbol to transmit the SSB or CORESET 0, and the PUCCH resource includes the flexible symbol, then the PUCCH resource is unavailable.

If the first PUCCH resource is available, it is indicated that the first time-domain unit is a time-domain unit for transmitting the multiple SPS HARQ-ACKs. If the first PUCCH resource is unavailable, it is indicated that the first time-domain unit is not a time-domain unit for transmitting the multiple SPS HARQ-ACKs.

The first time-domain unit being a time-domain unit for transmitting the multiple SPS HARQ-ACKs just indicates that the multiple SPS HARQ-ACKs may be transmitted in the first time-domain unit. Actually, the multiple SPS HARQ-ACKs may not necessarily be transmitted in the first time-domain unit. For example, the terminal does not transmit the multiple SPS HARQ-ACKs in the first time-domain unit if at least one of the following occurs: a PUCCH resource on the first time-domain unit determined by the terminal conflicts with a downlink resource dynamically scheduled by the network device; the PUCCH resource on the first time-domain unit determined by the terminal conflicts with a time-domain resource for uplink data of a higher priority; or, the terminal receives an instruction sent by the network device to stop transmission. The above situations may be referred to collectively as resource collisions. These situations may also apply to cases described below that the first time-domain unit is a time-domain unit for transmitting the first SPS HARQ-ACK set, and the first time-domain unit is a time-domain unit for transmitting the second SPS HARQ-ACK set. Transmission of at least one of the first SPS HARQ-ACK set, the second SPS HARQ-ACK set, or a dynamic HARQ-ACK described below may indicate that the transmission is performed with no collision with another resource.

The terminal may transmit the multiple SPS HARQ-ACKs in the first time-domain unit when the first PUCCH resource is available. The PUCCH resource for transmitting the multiple SPS HARQ-ACKs is not limited specifically in the embodiments of the disclosure. For example, the terminal may transmit the multiple SPS HARQ-ACKs on the first PUCCH resource of the first time-domain unit. In another example, the terminal may re-determine a new PUCCH resource on the first time-domain unit, and transmit the multiple SPS HARQ-ACKs on the re-determined PUCCH resource. This is elaborated below with reference to a specific case.

Based on the above technical solutions, when the first PUCCH resource for carrying the multiple SPS HARQ-ACKs in the first time-domain unit is unavailable, the multiple SPS HARQ-ACKs may be classified in the embodiments of the disclosure, such as into any SPS HARQ-ACK in the first SPS HARQ-ACK set and any SPS HARQ-ACK in the second SPS HARQ-ACK set. Further, the terminal may determine whether the first time-domain unit is a time-domain unit for transmitting the first SPS HARQ-ACK set. That is, by determining whether part of the multiple SPS HARQ-ACKs may be transmitted in the first time-domain unit, the transmission opportunity of the SPS HARQ-ACK may be increased, thereby providing the network side with necessary SPS HARQ-ACK information and improving the system efficiency.

Further, the first SPS HARQ-ACK set may include at least one nondeferrable SPS HARQ-ACK and/or at least one deferred SPS HARQ-ACK. When the first PUCCH resource is unavailable, the terminal may prioritize transmission of a nondeferrable SPS HARQ-ACK and/or a deferred SPS HARQ-ACK in the first time-domain unit, which further increases the transmission opportunity of an SPS HARQ-ACK, thereby providing the network side with necessary SPS HARQ-ACK information and improving the system efficiency.

When the first PUCCH resource is available, the terminal may determine that the first time-domain unit is a time-domain unit for transmitting the multiple SPS HARQ-ACKs.

When the first PUCCH resource is unavailable, the terminal may determine that the first time-domain unit is not a time-domain unit for transmitting the multiple SPS HARQ-ACKs. The terminal may further determine a second PUCCH resource in the first time-domain unit to determine whether the first time-domain unit is a time-domain unit for transmitting the first SPS HARQ-ACK set. The terminal may determine the second PUCCH resource according to the first SPS HARQ-ACK set. In other words, the second PUCCH resource may be determined based on the first SPS HARQ-ACK set. The terminal may determine whether the first time-domain unit is the time-domain unit for transmitting the first SPS HARQ-ACK set according to whether the second PUCCH resource is available. That is, the determination regarding whether the first time-domain unit is the time-domain unit for transmitting the first SPS HARQ-ACK set is based on whether the second PUCCH resource is available.

When the second PUCCH resource is available, the terminal may determine that the first time-domain unit is the time-domain unit for transmitting the first SPS HARQ-ACK set. When the second PUCCH resource is unavailable, the terminal may determine that the first time-domain unit is not the time-domain unit for transmitting the first SPS HARQ-ACK set. The terminal may directly drop the first SPS HARQ-ACK set in this case. Taking the first SPS HARQ-ACK set including a nondeferrable SPS HARQ-ACK as an example, the nondeferrable SPS HARQ-ACK indicates that such SPS HARQ-ACK cannot be transmitted on a time-domain unit after the first time-domain unit. Therefore, the terminal may directly drop the first SPS HARQ-ACK set if there is no second PUCCH resource available for transmitting the first SPS HARQ-ACK set on the first time-domain unit.

A mode in which the second SPS HARQ-ACK set is transmitted is not limited specifically in the embodiments of the disclosure. As an example, the terminal defers transmission of the second SPS HARQ-ACK set regardless of whether the first time-domain unit is the time-domain unit for transmitting the first SPS HARQ-ACK set. In other words, the terminal defers transmission of the second SPS HARQ-ACK set when the first PUCCH resource is unavailable. As another example, the terminal may determine how to transmit the second SPS HARQ-ACK set according to transmission of the first SPS HARQ-ACK set. For example, the terminal defers transmission of the second SPS HARQ-ACK set if the first time-domain unit is the time-domain unit for transmitting the first SPS HARQ-ACK set. In another example, the terminal determines whether the first time-domain unit is a time-domain unit for transmitting the second SPS HARQ-ACK set if the first time-domain unit is not the time-domain unit for transmitting the first SPS HARQ-ACK set. As yet another example, the terminal drops the second SPS HARQ-ACK set when the first time-domain unit is not the time-domain unit for transmitting the first SPS HARQ-ACK set. That is, when the first time-domain unit is not the time-domain unit for transmitting the first SPS HARQ-ACK set, the terminal may drop the multiple SPS HARQ-ACKs. That is, the terminal may drop both the first SPS HARQ-ACK set and the second SPS HARQ-ACK set at the same time, simplifying processing at the terminal and the network device and reducing power consumption.

In addition to SPS HARQ-ACKs, there may further be a dynamic HARQ-ACK to be transmitted on the first time-domain unit. For example, the network device sends a dynamically scheduled PDSCH to the terminal, and indicates a PUCCH resource for transmitting a dynamic HARQ-ACK corresponding to the dynamically scheduled PDSCH. The PUCCH resource for transmitting the dynamic HARQ-ACK may be located in the time-domain unit same as the PUCCH resource for transmitting the SPS HARQ-ACKs. In this case, the first PUCCH resource may be determined according to the multiple SPS HARQ-ACKs and/or the dynamic HARQ-ACK.

For example, the terminal determines the first PUCCH resource according to the dynamic HARQ-ACK, the multiple SPS HARQ-ACKs and the PUCCH resource corresponding to the dynamic HARQ-ACK to be transmitted on the first time-domain unit. That is, the terminal may perform SPS HARQ-ACK deferral after multiplexing the multiple SPS HARQ-ACKs and the dynamic HARQ-ACK. In another example, the terminal determines the first PUCCH resource according to the multiple SPS HARQ-ACKs. That is, the terminal may perform SPS HARQ-ACK deferral before multiplexing the multiple SPS HARQ-ACKs and the dynamic HARQ-ACK. The two cases are elaborated respectively below.

Embodiment 1

Embodiment 1 is described with the example that the terminal determines the first PUCCH resource according to a dynamic HARQ-ACK, multiple SPS HARQ-ACKs and a PUCCH resource corresponding to the dynamic HARQ-ACK to be transmitted in the first time-domain unit. In other words, the terminal may first consider whether there is a dynamic HARQ-ACK to be transmitted in the first time-domain unit, and then determine the first PUCCH resource.

If there is a dynamic HARQ-ACK to be transmitted on the first time-domain unit, the terminal may determine the first PUCCH resource according to the dynamic HARQ-ACK and the multiple SPS HARQ-ACKs. That is, the terminal may determine the first PUCCH resource according to the dynamic HARQ-ACK, the first SPS HARQ-ACK set, and the second SPS HARQ-ACK set. It is to be noted that the dynamic HARQ-ACK may include a PUCCH resource corresponding to the dynamic HARQ-ACK, and a dynamic HARQ-ACK payload. In other words, the terminal may determine the first PUCCH resource according to the PUCCH resource corresponding to the dynamic HARQ-ACK and a total payload of the dynamic HARQ-ACK and the multiple SPS HARQ-ACKs.

The network device may configure a PUCCH resource set (which may be referred to as a dynamic PUCCH resource set) for dynamic scheduling. The dynamic PUCCH resource set may include multiple PUCCH resources. The multiple PUCCH resources may correspond to HARQ-ACK payload. The HARQ-ACK payload may refer to a number of bits required for HARQ-ACK transmission. When determining the first PUCCH resource, the terminal may select, from the dynamic PUCCH resource set, a PUCCH resource corresponding to the number of bits required.

For example, assuming that a dynamic PUCCH resource set includes 16 PUCCH resources. The 16 PUCCH resources may be divided into 4 groups of PUCCH resources, and a group of PUCCH resources may correspond to a range of number of bits. The terminal may select a corresponding PUCCH resource group according to the total payload of the dynamic HARQ-ACK and the multiple SPS HARQ-ACKs. Further, the terminal may determine which PUCCH resource in the PUCCH resource group is used according to dynamic indication signalling, such as DCI, sent by the network device, and take the PUCCH resource as the first PUCCH resource. The PUCCH resource is available because the PUCCH resource is dynamically scheduled by the network device. Therefore, when there is a dynamic HARQ-ACK to be transmitted in the first time-domain unit, the terminal may determine the first time-domain unit to be the time-domain unit for transmitting the dynamic HARQ-ACK and the multiple SPS HARQ-ACKs. Further, the terminal may transmit the dynamic HARQ-ACK and the multiple SPS HARQ-ACKs on the first PUCCH resource.

If there is no dynamic HARQ-ACK to be transmitted in the first time-domain unit, the terminal may determine the first PUCCH resource according to the total payload of the multiple SPS HARQ-ACKs. That is, the terminal may determine the first PUCCH resource according to the first SPS HARQ-ACK set and the second SPS HARQ-ACK set if there is no dynamic HARQ-ACK to be transmitted in the first time-domain unit.

The network device may configure a PUCCH resource set (which may be referred to as a semi-static PUCCH resource set) for semi-static scheduling. The semi-static PUCCH resource set may include multiple PUCCH resources. The multiple PUCCH resources may correspond to HARQ-ACK payload. The HARQ-ACK payload may refer to a number of bits required for HARQ-ACK transmission. When determining the first PUCCH resource, the terminal may select, from the multiple PUCCH resources, a PUCCH resource corresponding to the number of bits required.

For example, assuming that a semi-static PUCCH resource set includes 4 PUCCH resources. Each PUCCH resource may correspond to a range of number of bits. The terminal may select, according to the total payload of the multiple SPS HARQ-ACKs, a PUCCH resource corresponding to the total payload of the multiple SPS HARQ-ACKs from multiple PUCCH resources. The selected PUCCH resource may be the first PUCCH resource.

The selected PUCCH resource may not necessarily be available for transmission as the first PUCCH resource is configured semi-statically. That is, the first PUCCH resource may include at least one of a downlink symbol, an SSB, or CORESET 0. Therefore, the first PUCCH resource may be either available or unavailable. If the first PUCCH resource is available, the terminal may determine that the first time-domain unit is the time-domain unit for transmitting the multiple SPS HARQ-ACKs. Further, the terminal may transmit the multiple SPS HARQ-ACKs on the first PUCCH resource. If the first PUCCH resource is unavailable, the terminal may further determine whether the first time-domain unit is the time-domain unit for transmitting the first SPS HARQ-ACK set.

The terminal may determine a second PUCCH resource in the first time-domain unit according to the first SPS HARQ-ACK set. Further, the terminal may determine whether the first time-domain unit is the time-domain unit for transmitting the first SPS HARQ-ACK set according to whether the second PUCCH resource is available. The second PUCCH resource is determined in the mode similar to that described above. The terminal may select, from the semi-static PUCCH resource set, a PUCCH resource corresponding to the total payload of the first SPS HARQ-ACK set. The selected PUCCH resource is the second PUCCH resource.

The selected second PUCCH resource may be either available or unavailable as the second PUCCH resource is configured semi-statically. If the second PUCCH resource is available, the terminal may determine that the first time-domain unit is the time-domain unit for transmitting the first SPS HARQ-ACK set. The terminal may transmit the first SPS HARQ-ACK set on the second PUCCH resource. If the second PUCCH resource is unavailable, the terminal may drop the first SPS HARQ-ACK set.

The terminal may transmit the second SPS HARQ-ACK set in two modes. In mode 1, the terminal may defer transmission of the second SPS HARQ-ACK set when the first PUCCH resource is unavailable. That is, the terminal may defer transmission of the second SPS HARQ-ACK set regardless of whether the second PUCCH resource is available, i.e., whether the first time-domain unit is the time-domain unit for transmitting the first SPS HARQ-ACK set. In mode 2, when the first PUCCH resource is unavailable, the terminal may determine whether to defer transmission of the second SPS HARQ-ACK set according to whether the second PUCCH resource is available. The terminal may defer transmission of the second SPS HARQ-ACK set if the second PUCCH resource is available. The terminal may continue to determine a third PUCCH resource in the first time-domain unit if the second PUCCH resource is unavailable. The terminal may determine the third PUCCH resource in the first time-domain unit according to the second SPS HARQ-ACK set. That is, the third PUCCH resource may be determined according to the second SPS HARQ-ACK set. The third PUCCH resource may be determined in a mode similar to the mode of determining the second PUCCH resource. That is, the third PUCCH resource may be a PUCCH resource corresponding to the total payload of the second SPS HARQ-ACK set in the semi-static PUCCH resource set. If the third PUCCH resource is available, the terminal may determine that the first time-domain unit is the time-domain unit for transmitting the second SPS HARQ-ACK set. If the third PUCCH resource is unavailable, the terminal may defer transmission of the second SPS HARQ-ACK set. The terminal may transmit the second SPS HARQ-ACK set on the third PUCCH resource when the third PUCCH resource is available.

The following is described with reference to FIG. 4 by taking the time-domain unit being a slot as an example. As illustrated in FIG. 4. SPS PDSCH 1 and SPS PDSCH 2 are transmitted respectively in the first downlink slot and the second downlink slot. Feedback parameters for both the SPS PDSCH 1 and the SPS PDSCH 2 are K1=1 and $K1_{def}$=1, then an interval between a slot in which the network device sends the SPS PDSCH 1 and a slot in which the terminal reports SPS HARQ-ACK 1 corresponding to the SPS PDSCH 1 may be {1, 2} slots, and an interval between a slot in which the network device sends the SPS PDSCH 2 and a slot in which the terminal reports SPS HARQ-ACK 2 corresponding to the SPS PDSCH 2 may be 11, 21 slots. The terminal may drop a corresponding SPS HARQ-ACK if the interval is greater than 2 slots. For the SPS PDSCH 1, the terminal may determine to transmit the SPS HARQ-ACK 1 in the second slot according to K1. However, as the second slot is a downlink slot, the terminal may defer transmission of the SPS HARQ-ACK 1 until the third slot. For the SPS PDSCH 2, the terminal may determine to transmit the SPS HARQ-ACK 2 in the third slot according to K1.

Assuming that no dynamic HARQ-ACK is in the third slot, the terminal may determine PUCCH 1 according to the SPS HARQ-ACK 1 and the SPS HARQ-ACK 2. As illustrated in FIG. 4, the SPS HARQ-ACK 1 and the SPS HARQ-ACK 2 may not be transmitted on the PUCCH 1 as the PUCCH 1 includes a downlink symbol. Further, the terminal may determine PUCCH 2 in the third slot according to a nondeferrable SPS HARQ-ACK (such as, the SPS HARQ-ACK 1). As illustrated in FIG. 4, as the PUCCH 2 does not include a downlink symbol, an SSB or CORESET 0, it is indicated that the PUCCH 2 is available. The terminal may determine the third slot to be the slot for transmitting the SPS HARQ-ACK 1. The terminal may transmit the SPS HARQ-ACK t on the PUCCH 2 as long as there is no collision with another resource. For a deferrable SPS HARQ-ACK, such as the SPS HARQ-ACK 2, the terminal may defer transmission of the SPS HARQ-ACK 2. Further, the terminal may determine whether the fourth slot is the slot for transmitting the SPS HARQ-ACK 2. The terminal may determine PUCCH 3 in the fourth slot according to the SPS HARQ-ACK 2, and may determine the fourth slot to be the slot for transmitting the SPS HARQ-ACK 2 when the PUCCH 3 is available. The terminal may transmit the SPS HARQ-ACK 2 on the PUCCH 3 as long as there is no collision with another resource.

Embodiment 2

Embodiment 2 is described with the example that the terminal determines the first PUCCH resource according to the multiple SPS HARQ-ACKs. In other words, instead of first considering whether there is a dynamic HARQ-ACK in the first time-domain unit, the terminal may determine the first PUCCH resource directly according to the multiple SPS HARQ-ACKs. In other words, the terminal may determine the first PUCCH resource according to the first SPS HARQ-ACK set and the second SPS HARQ-ACK set.

The terminal may determine the first PUCCH resource according to the total payload of the multiple SPS HARQ-ACKs. The first PUCCH resource may be determined in the mode similar to that described in Embodiment 1. i.e., the terminal may determine a PUCCH resource corresponding to the total payload of the multiple SPS HARQ-ACKs in the semi-static PUCCH resource set as the first PUCCH resource.

The first PUCCH resource may be either available or unavailable as the first PUCCH resource is configured semi-statically. Whether the first PUCCH resource is available may decide whether the first time-domain unit is the time-domain unit for transmitting the multiple SPS HARQ-ACKs. In other words, the determination regarding whether the first time-domain unit is the time-domain unit for transmitting the multiple SPS HARQ-ACKs is based on whether the first PUCCH resource is available. The terminal may determine whether the first time-domain unit is the time-domain unit for transmitting the multiple SPS HARQ-ACKs according to whether the first PUCCH resource is available.

If the first PUCCH resource is available, the terminal may determine that the first time-domain unit is the time-domain unit for transmitting the multiple SPS HARQ-ACKs. Further, the terminal may determine whether there is a dynamic HARQ-ACK to be transmitted in the first time-domain unit. If there is no dynamic HARQ-ACK to be transmitted in the first time-domain unit, the terminal may transmit the multiple SPS HARQ-ACKs on the first PUCCH resource. If there is a dynamic HARQ-ACK to be transmitted in the first time-domain unit, the terminal may determine a target PUCCH resource according to the PUCCH resource corresponding to the dynamic HARQ-ACK, the dynamic HARQ-ACK, and the multiple SPS HARQ-ACKs. The target PUCCH resource may be determined in the mode similar to that described in Embodiment 1, i.e., the terminal may first determine a PUCCH resource group in the dynamic PUCCH resource set according to the total payload of the dynamic HARQ-ACK and the multiple SPS HARQ-ACKs, and then determine which PUCCH resource in the PUCCH resource group is used according to dynamic indication signalling sent by the network device. The determined PUCCH resource is the target PUCCH resource. Further, the terminal may transmit the dynamic HARQ-ACK and the multiple SPS HARQ-ACKs on the target PUCCH resource.

If the first PUCCH resource is unavailable, it is indicated that the first time-domain unit is not the time-domain unit for transmitting the multiple SPS HARQ-ACKs. The terminal may determine the second PUCCH resource in the first time-domain unit according to the first SPS HARQ-ACK set. The second PUCCH resource may be determined according to the total payload of the first SPS HARQ-ACK set. The terminal may determine a PUCCH resource corresponding to the total payload of the first SPS HARQ-ACK set in the semi-static PUCCH resource set as the second PUCCH resource. The second PUCCH resource may be available or unavailable. Whether the second PUCCH resource is available may decide whether the first time-domain unit is the time-domain unit for transmitting the first SPS HARQ-ACK set. The terminal may determine whether the first time-domain unit is the time-domain unit for transmitting the first SPS HARQ-ACK set according to whether the second PUCCH resource is available.

If the second PUCCH resource is available, it is indicated that the first time-domain unit is the time-domain unit for transmitting the first SPS HARQ-ACK set. Further, the terminal may determine whether there is a dynamic HARQ-ACK to be transmitted in the first time-domain unit. The terminal may transmit the first SPS HARQ-ACK set on the second PUCCH resource if there is no dynamic HARQ-ACK to be transmitted in the first time-domain unit. If there is a dynamic HARQ-ACK to be transmitted in the first time-domain unit, the terminal may determine a target PUCCH resource according to the PUCCH resource corresponding to the dynamic HARQ-ACK, the dynamic HARQ-ACK, and the first SPS HARQ-ACK set. The target PUCCH resource may be determined in the mode similar to that described above. The terminal may first determine a PUCCH resource group in the dynamic PUCCH resource set according to the total payload of the dynamic HARQ-ACK and the first SPS HARQ-ACK set, and then determine which PUCCH resource in the PUCCH resource group is used according to dynamic indication signalling sent by the network device. The determined PUCCH resource is the target PUCCH resource. Further, the terminal may transmit the dynamic HARQ-ACK and the first SPS HARQ-ACK set on the target PUCCH resource.

If the second PUCCH resource is available, the terminal may defer transmission of the second SPS HARQ-ACK set. The terminal may further determine whether the next time-domain unit of the first time-domain unit is the time-domain unit for transmitting the second SPS HARQ-ACK set.

If the second PUCCH resource is unavailable, it is indicated that the first SPS HARQ-ACK set cannot be transmitted on the first time-domain unit. The terminal may drop the first SPS HARQ-ACK set.

The terminal may transmit the second SPS HARQ-ACK set in two modes. In mode 1, the terminal may defer transmission of the second SPS HARQ-ACK set when the first PUCCH resource is unavailable. That is, the terminal may defer transmission of the second SPS HARQ-ACK set regardless of whether the second PUCCH resource is available, i.e., whether the first time-domain unit is the time-domain unit for transmitting the first SPS HARQ-ACK set. In mode 2, when the first PUCCH resource is unavailable, the terminal may determine whether to defer transmission of the second SPS HARQ-ACK set according to whether the second PUCCH resource is available. The terminal may defer transmission of the second SPS HARQ-ACK set if the second PUCCH resource is available. The terminal may continue to determine a third PUCCH resource in the first time-domain unit if the second PUCCH resource is unavailable. The terminal may determine the third PUCCH resource in the first time-domain unit according to the second SPS HARQ-ACK set. That is, the third PUCCH resource may be determined according to the second SPS HARQ-ACK set. The third PUCCH resource may be determined in the mode similar to that described above. The terminal may determine a PUCCH resource corresponding to the total payload of the second SPS HARQ-ACK set in the semi-static PUCCH resource set as the third PUCCH resource. The third PUCCH resource may be available or unavailable.

If the third PUCCH resource is available, it is indicated that the first time-domain unit is the time-domain unit for transmitting the second SPS HARQ-ACK set. Further, the terminal may determine whether there is a dynamic HARQ-ACK to be transmitted in the first time-domain unit. If there is no dynamic HARQ-ACK to be transmitted in the first time-domain unit, the terminal may transmit the second SPS HARQ-ACK set on the third PUCCH resource. If there is a dynamic HARQ-ACK to be transmitted in the first time-domain unit, the terminal may determine a target PUCCH resource according to the PUCCH resource corresponding to the dynamic HARQ-ACK, the dynamic HARQ-ACK, and the second SPS HARQ-ACK set. The target PUCCH resource may be determined in the mode similar to that described above. The terminal may first determine a PUCCH resource group in the dynamic PUCCH resource set according to the total payload of the dynamic HARQ-ACK and the second SPS HARQ-ACK set, and then determine which PUCCH resource in the PUCCH resource group is used according to dynamic indication signalling sent by the network device. The determined PUCCH resource is the target PUCCH resource. Further, the terminal may transmit the dynamic HARQ-ACK and the second SPS HARQ-ACK set on the target PUCCH resource.

The terminal may defer transmission of the second SPS HARQ-ACK set if the third PUCCH resource is unavailable. That is, the terminal may further determine whether the next time-domain unit of the first time-domain unit is the time-domain unit for transmitting the second SPS HARQ-ACK set.

Figure 5:
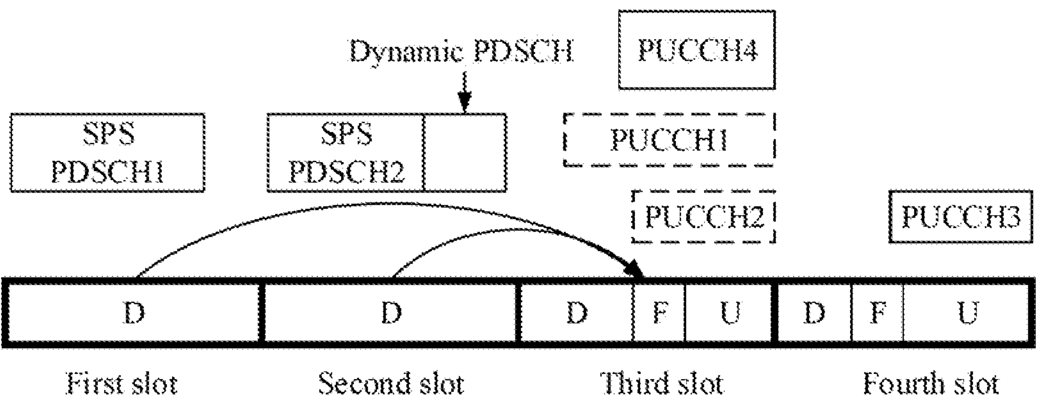
FIG. 5 is another schematic diagram of determining a time-domain unit for transmitting a first SPS HARQ-ACK set and a second SPS HARQ-ACK set according to an embodiment of the disclosure.

The following is described with reference to FIG. 5 by taking the time-domain unit being a slot as an example. As illustrated in FIG. 5, SPS PDSCH 1 and SPS PDSCH 2 are transmitted respectively in the first downlink slot and the second downlink slot. Feedback parameters for both the SPS PDSCH 1 and the SPS PDSCH 2 are K1=1 and $K1_{def}$=1, then an interval between a slot in which the network device sends the SPS PDSCH 1 and a slot in which the terminal reports SPS HARQ-ACK 1 corresponding to the SPS PDSCH 1 may be {1, 2} slots, and an interval between a slot in which the network device sends the SPS PDSCH 2 and a slot in which the terminal reports SPS HARQ-ACK 2 corresponding to the SPS PDSCH 2 may be {1, 2} slots. The terminal may drop a corresponding SPS HARQ-ACK if the interval is greater than 2 slots. For the SPS PDSCH 1, the terminal may determine to transmit the SPS HARQ-ACK 1 in the second slot according to K1. However, as the second slot is a downlink slot, the terminal may defer transmission of the SPS HARQ-ACK 1 until the third slot. For the SPS PDSCH 2, the terminal may determine to transmit the SPS HARQ-ACK 2 in the third slot according to K1.

The terminal may determine PUCCH 1 in the third slot according to the SPS HARQ-ACK 1 and the SPS HARQ-ACK 2. As illustrated in FIG. 5, the SPS HARQ-ACK 1 and the SPS HARQ-ACK 2 are unable to be transmitted on the PUCCH 1 as the PUCCH 1 includes a downlink symbol. Further, the terminal may determine PUCCH 2 in the third slot according to a nondeferrable SPS HARQ-ACK (such as, the SPS HARQ-ACK 1). The terminal may determine the third slot to be the slot for transmitting the SPS HARQ-ACK 1 as the PUCCH 2 is located on an uplink symbol and a flexible symbol. As there is a dynamic HARQ-ACK to be transmitted in the third slot, the terminal may determine PUCCH 4 according to the PUCCH resource corresponding to the dynamic HARQ-ACK and the total payload of the dynamic HARQ-ACK and the SPS HARQ-ACK 1. The terminal may transmit the dynamic HARQ-ACK and the SPS HARQ-ACK 1 on the PUCCH 4 as long as there is no collision with another resource.

The PUCCH 2 is available, and then the terminal may defer a deferrable SPS HARQ-ACK such as the SPS HARQ-ACK 2. The terminal may determine whether the fourth slot is the slot for transmitting the SPS HARQ-ACK 2. The terminal may determine PUCCH 3 in the fourth slot according to the payload of the SPS HARQ-ACK 2. The terminal may determine the fourth slot to be the slot for transmitting the SPS HARQ-ACK 2 as PUCCH 3 is located on a flexible symbol and an uplink symbol. The terminal may transmit the SPS HARQ-ACK 2 on the PUCCH 3 as long as there is no collision with another resource.

The terminal may not receive a dynamic PDSCH sent by the network device. In this case, the terminal may proceed according to the case that there is no dynamic HARQ-ACK, while the network device may still proceed according to the case that there is a dynamic HARQ-ACK, so that the network device is not aligned with the terminal, resulting in that the network device cannot receive an HARQ-ACK sent by the terminal. The opportunity for the network device to receive an HARQ-ACK is increased to a certain extent according to the mode of Embodiment 2. In Embodiment 2, it is determined first whether the multiple SPS HARQ-ACKs may be transmitted in the first time-domain unit; then, it is determined whether there is a dynamic HARQ-ACK to be transmitted in the first time-domain unit. The terminal may transmit the multiple SPS HARQ-ACKs in the first time-domain unit when it is determined that the first time-domain unit is the time-domain unit for transmitting the multiple SPS HARQ-ACKs. The terminal does not transmit the multiple SPS HARQ-ACKs in the first time-domain unit when the multiple SPS HARQ-ACKs cannot be transmitted in the first time-domain unit. Therefore, whether the terminal transmits the multiple SPS HARQ-ACKs in the first time-domain unit is not impacted by whether there is a dynamic HARQ-ACK, thereby increasing the opportunity for the network device to receive an HARQ-ACK.

In addition to the above method, the terminal may not expect to transmit SPS HARQ-ACKs with inconsistent deferral configurations in the same time-domain unit. In other words, instead of determining whether the first time-domain unit is a time-domain unit for transmitting the first SPS HARQ-ACK set and the second SPS HARQ-ACK set, the terminal may transmit the first SPS HARQ-ACK set and the second SPS HARQ-ACK set directly in different time-domain units.

Figure 6:
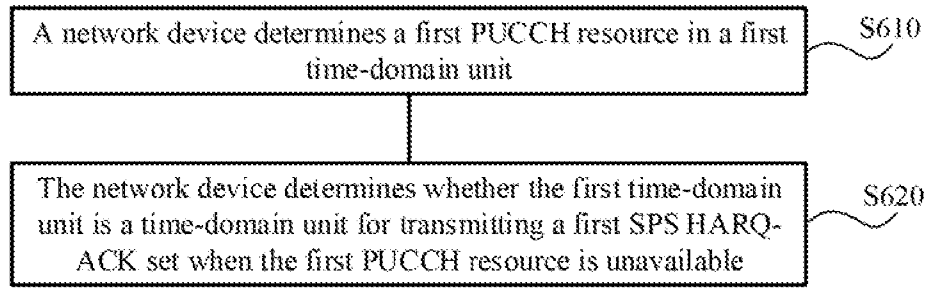
FIG. 6 is a schematic flowchart of another method for transmitting uplink feedback information according to an embodiment of the disclosure.

FIG. 6 is a schematic flowchart of another method for transmitting uplink feedback information according to an embodiment of the disclosure. FIG. 6 illustrates, from the angle of the network side, the method for transmitting uplink feedback information according to the embodiment of the disclosure. It should be understood that the interaction between the terminal and the network device, as well as a relevant feature, a function, etc., described at the network side may correspond to those described at the terminal side. Repetitious descriptions are omitted where appropriate for brevity.

As illustrated in FIG. 6, at S610, a network device determines a first PUCCH resource in a first time-domain unit.

The first PUCCH resource may be used for carrying multiple SPS HARQ-ACKs. The multiple SPS HARQ-ACKs may be feedbacks for multiple SPS PDSCHs. The multiple SPS HARQ-ACKs are SPS HARQ-ACKs that need to be transmitted in the same time-domain unit. That is, the first PUCCH resource may be a resource on the first time-domain unit. The first PUCCH resource may occupy the entire first time-domain unit, or the first PUCCH resource may include some OFDM symbols on the first time-domain unit.

The multiple SPS HARQ-ACKs may include at least one SPS HARQ-ACK in a first SPS HARQ-ACK set and at least one SPS HARQ-ACK in a second SPS HARQ-ACK set. An SPS HARQ-ACK in the first SPS HARQ-ACK set, as well as an SPS HARQ-ACK in the second SPS HARQ-ACK set, may be determined according to at least one of: whether SPS HARQ-ACK deferral being configured for the SPS HARQ-ACK; whether the terminal supports the SPS HARQ-ACK deferral; or, whether a deferral duration of the SPS HARQ-ACK reaching an upper limit.

If the terminal does not support SPS HARQ-ACK deferral, the terminal does not defer any SPS HARQ-ACK. In this case, the multiple SPS HARQ-ACKs may include only SPS HARQ-ACKs in the first SPS HARQ-ACK set. If the terminal supports SPS HARQ-ACK deferral, the terminal may determine the first SPS HARQ-ACK set and the second SPS HARQ-ACK set according to whether SPS HARQ-ACK deferral is configured for an SPS HARQ-ACK and/or whether a deferral duration of an SPS HARQ-ACK reaches an upper limit.

A mode of classifying SPS HARQ-ACKs into the first SPS HARQ-ACK set and the second SPS HARQ-ACK set is not limited specifically in the embodiments of the disclosure. For example, SPS HARQ-ACKs are classified according to whether an SPS HARQ-ACK is deferrable. The first SPS HARQ-ACK set includes at least one nondeferrable SPS HARQ-ACK, and the second SPS HARQ-ACK set includes at least one deferrable SPS HARQ-ACK. In another example, SPS HARQ-ACKs are classified according to whether an SPS HARQ-ACK has been deferred. The first SPS HARQ-ACK set includes at least one deferred SPS HARQ-ACK, and the second SPS HARQ-ACK set includes at least one SPS HARQ-ACK that has not been deferred. In yet another example, the first SPS HARQ-ACK set includes a nondeferrable SPS HARQ-ACK and/or a deferred SPS HARQ-ACK, and the second SPS HARQ-ACK set includes a deferrable SPS HARQ-ACK or a SPS HARQ-ACK without deferral.

For example, the at least one SPS HARQ-ACK in the first SPS HARQ-ACK set includes at least one of an SPS HARQ-ACK without SPS HARQ-ACK deferral, or an SPS HARQ-ACK with a deferral duration reaching an upper limit. The at least one SPS HARQ-ACK in the second SPS HARQ-ACK set may include an SPS HARQ-ACK configured with SPS HARQ-ACK deferral and having a deferral duration not reaching the upper limit.

The network device may determine the first PUCCH resource in multiple modes. The network device may determine the first PUCCH resource according to the multiple SPS HARQ-ACKs and/or a dynamic HARQ-ACK to be sent in the first time-domain unit. In other words, the first PUCCH resource may be determined based on the multiple SPS HARQ-ACKs and/or the dynamic HARQ-ACK to be sent in the first time-domain unit. The network device may perform SPS HARQ-ACK deferral before or after multiplexing the multiple SPS HARQ-ACKs and the dynamic HARQ-ACK. For example, when SPS HARQ-ACK deferral is performed before multiplexing the multiple SPS HARQ-ACKs and the dynamic HARQ-ACK, the network device may determine the first PUCCH resource according to the multiple SPS HARQ-ACKs. In other words, the first PUCCH resource may be determined based on the multiple SPS HARQ-ACKs. In another example, when SPS HARQ-ACK deferral is performed after multiplexing the multiple SPS HARQ-ACKs and the dynamic HARQ-ACK, the network device may determine the first PUCCH resource according to the multiple SPS HARQ-ACKs and the dynamic HARQ-ACK to be sent in the first time-domain unit. In other words, the first PUCCH resource may be determined based on the multiple SPS HARQ-ACKs and the dynamic HARQ-ACK to be sent in the first time-domain unit.

At S620, when the first PUCCH resource is unavailable, the network device determines whether the first time-domain unit is a time-domain unit for receiving the first SPS HARQ-ACK set.

In the embodiments of the disclosure, a PUCCH resource may be available or unavailable. A PUCCH resource being available indicates that the PUCCH resource is available for transmission. A PUCCH resource being unavailable indicates that the PUCCH is unavailable for transmission. A PUCCH resource is unavailable if the PUCCH resource meets at least one of the following: symbols corresponding to the PUCCH resource include a semi-static downlink symbol, the symbols corresponding to the PUCCH resource include a symbol where an SSB is located, or the symbols corresponding to the PUCCH resource include a symbol where CORESET 0 is located. That is, a PUCCH resource may be determined to be unavailable as long as the PUCCH resource meets any of the above conditions. If a PUCCH resource includes no semi-static downlink symbol, no symbol carrying the SSB, and no symbol carrying the CORESET 0, the PUCCH resource may be determined to be available. The PUCCH resource here may be any one PUCCH resource in the embodiments of the disclosure. For example, the PUCCH resource includes at least one of the first PUCCH resource, a second PUCCH resource, or a third PUCCH resource.

Based on the above technical solutions, when the first PUCCH resource for carrying the multiple SPS HARQ-ACKs in the first time-domain unit is unavailable, the multiple SPS HARQ-ACKs may be classified in the embodiments of the disclosure, such as into any SPS HARQ-ACK in the first SPS HARQ-ACK set and any SPS HARQ-ACK in the second SPS HARQ-ACK set. Further, the network device may determine whether the first time-domain unit is a time-domain unit for receiving the first SPS HARQ-ACK set. That is, by determining whether part of the multiple SPS HARQ-ACKs may be received in the first time-domain unit, the transmission opportunity of the SPS HARQ-ACK may be increased, thereby providing the network side with necessary SPS HARQ-ACK information and improving the system efficiency.

In some embodiment, if the first time-domain unit is not the time-domain unit for receiving the first SPS HARQ-ACK set, the network device may determine that the terminal drops the first SPS HARQ-ACK set. In this case, the network device may not receive the first SPS HARQ-ACK set. When the first PUCCH resource is unavailable, the network device may further determine a second PUCCH resource in the first time-domain unit to determine whether the first time-domain unit is the time-domain unit for receiving the first SPS HARQ-ACK set. The network device may determine that the first time-domain unit is the time-domain unit for receiving the first SPS HARQ-ACK set if the second PUCCH resource is available. The network device may determine that the terminal drops the first SPS HARQ-ACK set if the second PUCCH resource is unavailable. Taking the first SPS HARQ-ACK set including a nondeferrable SPS HARQ-ACK as an example, the nondeferrable SPS HARQ-ACK indicates that such SPS HARQ-ACK cannot be received on a time-domain unit after the first time-domain unit. Therefore, the network device may determine that the terminal drops the first SPS HARQ-ACK set if there is no second PUCCH resource available for receiving the first SPS HARQ-ACK set on the first time-domain unit.

A mode in which the second SPS HARQ-ACK set is received is not limited specifically in the embodiments of the disclosure. As an example, the network device defers reception of the second SPS HARQ-ACK set regardless of whether the first time-domain unit is the time-domain unit for receiving the first SPS HARQ-ACK set. In other words, the network device defers reception of the second SPS HARQ-ACK set when the first PUCCH resource is unavailable. As another example, the network device may determine how to receive the second SPS HARQ-ACK set according to reception of the first SPS HARQ-ACK set. For example, the network device defer reception of the second SPS HARQ-ACK set if the first time-domain unit is the time-domain unit for receiving the first SPS HARQ-ACK set. In another example, the network device determines whether the first time-domain unit is a time-domain unit for receiving the second SPS HARQ-ACK set if the first time-domain unit is not the time-domain unit for receiving the first SPS HARQ-ACK set. As yet another example, the network device may determine that the terminal drops the second SPS HARQ-ACK set when the first time-domain unit is not the time-domain unit for receiving the first SPS HARQ-ACK set. That is, the network device may determine that the terminal drops the multiple SPS HARQ-ACKs when the first time-domain unit is not the time-domain unit for receiving the first SPS HARQ-ACK set.

In addition to SPS HARQ-ACKs, there may further be a dynamic HARQ-ACK to be received in the first time-domain unit. For example, the network device sends a dynamically scheduled PDSCH to the terminal, and indicates a PUCCH resource for transmitting a dynamic HARQ-ACK corresponding to the dynamically scheduled PDSCH. The PUCCH resource may be located in the time-domain unit same as the time-domain unit for transmitting the SPS HARQ-ACKs. In this case, the first PUCCH resource may be determined according to the multiple SPS HARQ-ACKs and/or the dynamic HARQ-ACK.

In some embodiment, the first PUCCH resource is determined according to the multiple SPS HARQ-ACKs. That is, the network device may determine the first PUCCH resource according to the multiple SPS HARQ-ACKs.

In some embodiment, if there is a dynamic HARQ-ACK to be received in the first time-domain unit, the first PUCCH resource is determined according to the PUCCH resource corresponding to the dynamic HARQ-ACK, the dynamic HARQ-ACK, and the multiple SPS HARQ-ACKs. In other words, if there is a dynamic HARQ-ACK to be received in the first time-domain unit, the network device may determine the first PUCCH resource according to the dynamic HARQ-ACK and the multiple SPS HARQ-ACKs. The first PUCCH resource may be determined according to the multiple SPS HARQ-ACKs if there is no dynamic HARQ-ACK to be received in the first time-domain unit. In other words, the network device may determine the first PUCCH resource according to the multiple SPS HARQ-ACKs if there is no dynamic HARQ-ACK to be received in the first time-domain unit.

In some embodiment, the network device may determine a second PUCCH resource in the first time-domain unit when the first PUCCH resource is unavailable. The second PUCCH resource is determined according to the first SPS HARQ-ACK set. That is, the network device may determine the second PUCCH resource according to the first SPS HARQ-ACK set. The determination regarding whether the first time-domain unit is the time-domain unit for receiving the first SPS HARQ-ACK set is based on whether the second PUCCH resource is available. That is, the network device may determine whether the first time-domain unit is the time-domain unit for receiving the first SPS HARQ-ACK set according to whether the second PUCCH resource is available. The network device may determine that the first time-domain unit is the time-domain unit for receiving the first SPS HARQ-ACK set if the second PUCCH resource is available. The network device may determine that the first time-domain unit is not the time-domain unit for receiving the first SPS HARQ-ACK set if the second PUCCH resource is unavailable.

In some embodiment, the network device may determine a third PUCCH resource in the first time-domain unit. The third PUCCH resource is determined according to the second SPS HARQ-ACK set. That is, the network device may determine the third PUCCH resource according to the second SPS HARQ-ACK set. The determination regarding whether the first time-domain unit is the time-domain unit for receiving the second SPS HARQ-ACK set is based on whether the third PUCCH resource is available. That is, the network device may determine whether the first time-domain unit is the time-domain unit for receiving the second SPS HARQ-ACK set according to whether the third PUCCH resource is available. The network device may determine that the first time-domain unit is the time-domain unit for receiving the second SPS HARQ-ACK set if the third PUCCH resource is available. The network device may determine that the first time-domain unit is not the time-domain unit for receiving the second SPS HARQ-ACK set if the third PUCCH resource is unavailable.

Method embodiments of the disclosure are elaborated with reference to FIG. 1 to FIG. 6. Apparatus embodiments of the disclosure are elaborated below with reference to FIG. 7 to FIG. 9. It should be understood that description of the method embodiments corresponds to description of the apparatus embodiments. Refer to the above method embodiments for a part not elaborated.

Figure 7:
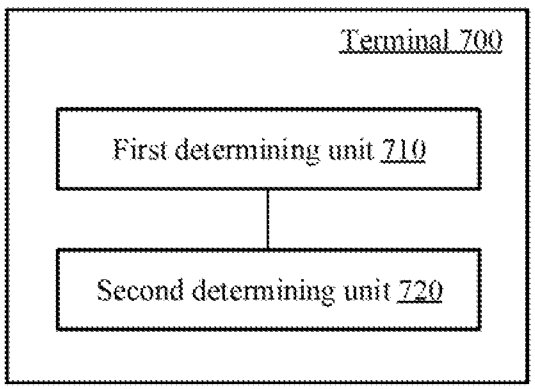
FIG. 7 is a schematic diagram of a structure of a terminal according to an embodiment of the disclosure.

FIG. 7 is a schematic diagram of a structure of a terminal according to an embodiment of the disclosure. The terminal 700 in FIG. 7 may include a first determining unit 710 and a second determining unit 720.

The first determining unit 710 may be configured to determine a first physical uplink control channel (PUCCH) resource in a first time-domain unit. The first PUCCH resource is used for carrying multiple semi-persistent scheduling (SPS) hybrid automatic repeat reQuest acknowledgments (HARQ-ACKs). The multiple SPS HARQ-ACKs include at least one SPS HARQ-ACK in a first SPS HARQ-ACK set and at least one SPS HARQ-ACK in a second SPS HARQ-ACK set.

The second determining unit 720 may be configured to determine, in response to the first PUCCH resource being unavailable, whether the first time-domain unit is a time-domain unit for transmitting the first SPS HARQ-ACK set.

In some embodiment, the terminal 700 further includes a first dropping unit. The first dropping unit may be configured to drop the first SPS HARQ-ACK set in response to the first time-domain unit being not the time-domain unit for transmitting the first SPS HARQ-ACK set.

In some embodiment, the terminal 700 further includes a first transmitting unit and a third determining unit. The first transmitting unit may be configured to defer transmission of the second SPS HARQ-ACK set in response to the first time-domain unit being the time-domain unit for transmitting the first SPS HARQ-ACK set. The third determining unit may be configured to determine whether the first time-domain unit is a time-domain unit for transmitting the second SPS HARQ-ACK set in response to the first time-domain unit being not the time-domain unit for transmitting the first SPS HARQ-ACK set.

In some embodiment, the terminal 700 further includes a second transmitting unit. The second transmitting unit may be configured to defer transmission of the second SPS HARQ-ACK set.

In some embodiment, the first determining unit 710 is configured to determine the first PUCCH resource based on the multiple SPS HARQ-ACKs and/or a dynamic HARQ-ACK to be transmitted in the first time-domain unit.

In some embodiment, the first determining unit 710 is configured to determine the first PUCCH resource based on the multiple SPS HARQ-ACKs.

In some embodiment, the first determining unit 710 is configured to determine, in response to a dynamic HARQ-ACK to be transmitted being present in the first time-domain unit, the first PUCCH resource based on the dynamic HARQ-ACK and the multiple SPS HARQ-ACKs; and determine, in response to no dynamic HARQ-ACK to be transmitted being present in the first time-domain unit, the first PUCCH resource based on the multiple SPS HARQ-ACKs.

In some embodiment, the second determining unit 720 is configured to determine a second PUCCH resource in the first time-domain unit based on the first SPS HARQ-ACK set, and determine whether the first time-domain unit is the time-domain unit for transmitting the first SPS HARQ-ACK set based on whether the second PUCCH resource is available.

In some embodiment, the terminal 700 further includes a fourth determining unit. The fourth determining unit may be configured to determine a third PUCCH resource in the first time-domain unit based on the second SPS HARQ-ACK set, and determine whether the first time-domain unit is a time-domain unit for transmitting the second SPS HARQ-ACK set based on whether the third PUCCH resource is available.

In some embodiment, the terminal 700 further includes a second dropping unit. The second dropping unit may be configured to drop the multiple SPS HARQ-ACKs in response to the first time-domain unit being not the time-domain unit for transmitting the first SPS HARQ-ACK set.

In some embodiment, the terminal 700 further includes a fifth determining unit. The fifth determining unit may be configured to determine that the first time-domain unit is a time-domain unit for transmitting the multiple SPS HARQ-ACKs in response to the first PUCCH resource being available.

In some embodiment, an SPS HARQ-ACK in the first SPS HARQ-ACK set and in the second SPS HARQ-ACK set is determined according to at least one of: whether SPS HARQ-ACK deferral is configured for the SPS HARQ-ACK; whether the terminal supports the SPS HARQ-ACK deferral; or whether a deferral duration of the SPS HARQ-ACK reaches an upper limit.

In some embodiment, the at least one SPS HARQ-ACK in the first SPS HARQ-ACK set includes at least one of an SPS HARQ-ACK without SPS HARQ-ACK deferral or an SPS HARQ-ACK with a deferral duration reaching an upper limit. The at least one SPS HARQ-ACK in the second SPS HARQ-ACK set includes an SPS HARQ-ACK configured with SPS HARQ-ACK deferral and having a deferral duration not reaching the upper limit.

In some embodiment, a PUCCH resource is determined to be unavailable in response to at least one of the following: at least one symbol corresponding to the PUCCH resource includes a semi-static downlink symbol; the at least one symbol corresponding to the PUCCH resource includes a symbol carrying a synchronization signal block (SSB); or the at least one symbol corresponding to the PUCCH resource may include a symbol carrying control resource set (CORESET) 0. The PUCCH resource includes at least one of the first PUCCH resource, a second PUCCH resource, or a third PUCCH resource.

Figure 8:
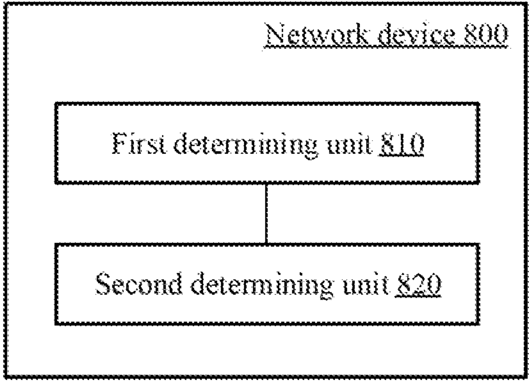
FIG. 8 is a schematic diagram of a structure of a network device according to an embodiment of the disclosure.

FIG. 8 is a schematic diagram of a structure of a network device according to an embodiment of the disclosure. The network device 800 in FIG. 8 may include a first determining unit 810 and a second determining unit 820.

The first determining unit 810 may be configured to determine a first physical uplink control channel (PUCCH) resource in a first time-domain unit. The first PUCCH resource is used for carrying multiple semi-persistent scheduling (SPS) hybrid automatic repeat reQuest acknowledgments (HARQ-ACKs). The multiple SPS HARQ-ACKs include at least one SPS HARQ-ACK in a first SPS HARQ-ACK set and at least one SPS HARQ-ACK in a second SPS HARQ-ACK set.

The second determining unit 820 may be configured to determine whether the first time-domain unit is a time-domain unit for receiving the first SPS HARQ-ACK set in response to the first PUCCH resource being unavailable.

In some embodiment, the network device 800 further includes a first receiving unit. The first receiving unit may be configured to determine that a terminal drops the first SPS HARQ-ACK set in response to the first time-domain unit being not the time-domain unit for receiving the first SPS HARQ-ACK set.

In some embodiment, the network device 800 further includes a second receiving unit and a third determining unit. The second receiving unit may be configured to defer reception of the second SPS HARQ-ACK set in response to the first time-domain unit being the time-domain unit for receiving the first SPS HARQ-ACK set. The third determining unit may be configured to determine whether the first time-domain unit is a time-domain unit for receiving the second SPS HARQ-ACK set in response to the first time-domain unit being not the time-domain unit for receiving the first SPS HARQ-ACK set.

In some embodiment, the network device 800 further includes a third receiving unit. The third receiving unit may be configured to defer reception of the second SPS HARQ-ACK set.

In some embodiment, the first determining unit 810 is configured to determine the first PUCCH resource based on the multiple SPS HARQ-ACKs and/or a dynamic HARQ-ACK to be received in the first time-domain unit.

In some embodiment, the first determining unit 810 is configured to determine the first PUCCH resource based on the multiple SPS HARQ-ACKs.

In some embodiment, the first determining unit 810 is configured to determine, in response to a dynamic HARQ-ACK to be received being present in the first time-domain unit, the first PUCCH resource based on the dynamic HARQ-ACK and the multiple SPS HARQ-ACKs, and determine, in response to no dynamic HARQ-ACK to be received being present in the first time-domain unit, the first PUCCH resource based on the multiple SPS HARQ-ACKs.

In some embodiment, the second determining unit 820 is configured to determine a second PUCCH resource in the first time-domain unit based on the first SPS HARQ-ACK set, and determine whether the first time-domain unit is the time-domain unit for receiving the first SPS HARQ-ACK set based on whether the second PUCCH resource is available.

In some embodiment, the network device 800 further includes a fourth determining unit. The fourth determining unit may be configured to determine a third PUCCH resource in the first time-domain unit based on the second SPS HARQ-ACK set, and determine whether the first time-domain unit is a time-domain unit for receiving the second SPS HARQ-ACK set based on whether the third PUCCH resource is available.

In some embodiment, the network device 800 further includes a fourth receiving unit. The fourth receiving unit may be configured to determine that a terminal drops the multiple SPS HARQ-ACKs in response to the first time-domain unit being not the time-domain unit for receiving the first SPS HARQ-ACK set.

In some embodiment, the network device 800 further includes a fifth determining unit. The fifth determining unit may be configured to determine that the first time-domain unit is a time-domain unit for receiving the multiple SPS HARQ-ACKs in response to the first PUCCH resource being available.

In some embodiment, an SPS HARQ-ACK in the first SPS HARQ-ACK set or in the second SPS HARQ-ACK set is determined according to at least one of: whether SPS HARQ-ACK deferral is configured for the SPS HARQ-ACK; whether a terminal supports the SPS HARQ-ACK deferral; or whether a deferral duration of the SPS HARQ-ACK reaches an upper limit.

In some embodiment, the at least one SPS HARQ-ACK in the first SPS HARQ-ACK set includes at least one of an SPS HARQ-ACK without SPS HARQ-ACK deferral, or an SPS HARQ-ACK with a deferral duration reaching an upper limit. The at least one SPS HARQ-ACK in the second SPS HARQ-ACK set includes an SPS HARQ-ACK configured with SPS HARQ-ACK deferral and having a deferral duration not reaching the upper limit.

In some embodiment, a PUCCH resource is determined to be unavailable in response to at least one of the following: at least one symbol corresponding to the PUCCH resource includes a semi-static downlink symbol; the at least one symbol corresponding to the PUCCH resource includes a symbol carrying a synchronization signal block (SSB); or the at least one symbol corresponding to the PUCCH resource may include a symbol carrying control resource set (CORESET) 0. The PUCCH resource may include at least one of the first PUCCH resource, a second PUCCH resource, or a third PUCCH resource.

Figure 9:
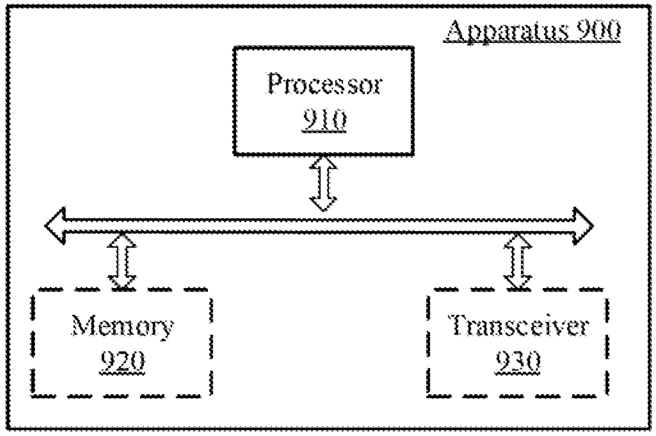
FIG. 9 is a schematic diagram of a structure of an apparatus for transmitting uplink feedback information according to an embodiment of the disclosure.

FIG. 9 is a schematic diagram of a structure of an apparatus for transmitting uplink feedback information according to an embodiment of the disclosure. A dotted line in FIG. 9 denotes an optional unit or module. The apparatus 900 may be configured to implement the method described in the above method embodiments. The apparatus 900 may be a chip, a terminal, or a network device.

The apparatus 900 may include one or more processors 910. The one or more processors 910 may support the apparatus 900 to implement the method described in the above method embodiments. The processor 910 may be a general-purpose processor or a dedicated processor. For example, the processor may be a central processing unit (CPU). Alternatively, the processor may be another general-purpose processor, a digital signal processor (DSP), an application specific integrated circuit (ASIC), a field programmable gate array (FPGA), or another programmable logic device, a discrete gate, or a transistor logic device, a discrete hardware component, etc. The general-purpose processor may be a microprocessor or any conventional processor, etc.

The apparatus 900 may further include one or more memories 920. The one or more memories 920 store thereon a program. The program may be executed by the one or more processors 910, to cause the one or more processors 910 to implement the method described in the above method embodiments. The one or more memories 920 may be separate from the one or more processors 910, or may be integrated in the one or more processors 910.

The apparatus 900 may further include a transceiver 930. The one or more processors 910 may communicate with another device or chip through the transceiver 930. For example, the one or more processors 910 may perform data transmission and reception with another device or chip through the transceiver 930.

The embodiments of the disclosure further provide a computer-readable storage medium configured to store a program. The computer-readable storage medium may be implemented in a terminal or a network device according to the embodiments of the disclosure, and the program causes a computer to implement the method implemented by the terminal or the network device in each embodiment of the disclosure.

The embodiments of the disclosure further provide a computer program product. The computer program product may include a program. The computer program product may be implemented in a terminal or a network device according to the embodiments of the disclosure, and the program causes a computer to implement the method implemented by the terminal or the network device in each embodiment of the disclosure.

The embodiments of the disclosure further provide a computer program. The computer program may be applied in a terminal or a network device according to the embodiments of the disclosure, and cause a computer to implement the method implemented by the terminal or the network device in each embodiment of the disclosure.

It is to be understood that, in the embodiments of the disclosure, "B corresponding to A" refers to that B is associated with A, and B may be determined according to A. However, it is to be understood that determination of B according to A does not mean that B is determined only according to A. Instead, B may also be determined according to A and/or other information.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting uplink feedback information, comprising:

determining, by a terminal, a first physical uplink control channel (PUCCH) resource in a first time-domain unit, the first PUCCH resource being configured for carrying multiple semi-persistent scheduling (SPS) hybrid automatic repeat reQuest acknowledgments (HARQ-ACKs), the multiple SPS HARQ-ACKs comprising at least one SPS HARQ-ACK in a first SPS HARQ-ACK set and at least one SPS HARQ-ACK in a second SPS HARQ-ACK set;

determining, by the terminal in response to the first PUCCH resource being unavailable, whether the first time-domain unit is a time-domain unit for transmitting the first SPS HARQ-ACK set;

dropping, by the terminal in response to the first time-domain unit being not the time-domain unit for transmitting the first SPS HARQ-ACK set, the first SPS HARQ-ACK set; and deferring, by the terminal in response to the first PUCCH resource being unavailable, transmission of the second SPS HARQ-ACK set;

wherein the at least one SPS HARQ-ACK in the first SPS HARQ-ACK set comprises at least one of an SPS HARQ-ACK without SPS HARQ-ACK deferral, or an SPS HARQ-ACK with a deferral duration reaching an upper limit; and the at least one SPS HARQ-ACK in the second SPS HARQ-ACK set comprises an SPS HARQ-ACK configured with SPS HARQ-ACK deferral and having a deferral duration not reaching the upper limit.

2. The method of claim 1, wherein determining, by the terminal, the first PUCCH resource in the first time-domain unit comprises:

determining, by the terminal, the first PUCCH resource based on the multiple SPS HARQ-ACKs.

3. The method of claim 1, further comprising:

determining, by the terminal in response to the first PUCCH resource being available, that the first time-domain unit is a time-domain unit for transmitting the multiple SPS HARQ-ACKs.

4. The method of claim 1, wherein an SPS HARQ-ACK of the at least one SPS HARQ-ACK in the first SPS HARQ-ACK set and in the second SPS HARQ-ACK set is determined according to at least one of:

whether SPS HARQ-ACK deferral is configured for the SPS HARQ-ACK;

whether the terminal supports the SPS HARQ-ACK deferral; or whether a deferral duration of the SPS HARQ-ACK reaches an upper limit.

5. The method of claim 1, wherein a PUCCH resource is determined to be unavailable in response to at least one of:

at least one symbol corresponding to the PUCCH resource comprising a semi-static downlink symbol;

the at least one symbol corresponding to the PUCCH resource comprising a symbol carrying a synchronization signal block (SSB); or the at least one symbol corresponding to the PUCCH resource comprising a symbol carrying control resource set (CORESET) 0, wherein the PUCCH resource comprises at least one of the first PUCCH resource, a second PUCCH resource, or a third PUCCH resource.

6. The method of claim 1, wherein determining, by the terminal in response to the first PUCCH resource being unavailable, whether the first time-domain unit is the time-domain unit for transmitting the first SPS HARQ-ACK set comprises:

determining, by the terminal, a second PUCCH resource in the first time-domain unit based on the first SPS HARQ-ACK set;

determining, by the terminal based on whether the second PUCCH resource is available, whether the first time-domain unit is the time-domain unit for transmitting the first SPS HARQ-ACK set;

determining, by the terminal, a third PUCCH resource in the first time-domain unit based on the second SPS HARQ-ACK set; and determining, by the terminal based on whether the third PUCCH resource is available, whether the first time-domain unit is a time-domain unit for transmitting the second SPS HARQ-ACK set.

7. A terminal, comprising: a memory and a processor, wherein the memory is configured to store a program, and the processor is configured to call the program in the memory to cause the terminal to:

determine a first physical uplink control channel (PUCCH) resource in a first time-domain unit, the first PUCCH resource being configured for carrying multiple semi-persistent scheduling (SPS) hybrid automatic repeat reQuest acknowledgments (HARQ-ACKs), the multiple SPS HARQ-ACKs comprising at least one SPS HARQ-ACK in a first SPS HARQ-ACK set and at least one SPS HARQ-ACK in a second SPS HARQ-ACK set;

determine, in response to the first PUCCH resource being unavailable, whether the first time-domain unit is a time-domain unit for transmitting the first SPS HARQ-ACK set;

drop the first SPS HARQ-ACK set in response to the first time-domain unit being not the time-domain unit for transmitting the first SPS HARQ-ACK set; and defer transmission of the second SPS HARQ-ACK set in response to the first PUCCH resource being unavailable;

wherein the at least one SPS HARQ-ACK in the first SPS HARQ-ACK set comprises at least one of an SPS HARQ-ACK without SPS HARQ-ACK deferral, or an SPS HARQ-ACK with a deferral duration reaching an upper limit; and the at least one SPS HARQ-ACK in the second SPS HARQ-ACK set comprises an SPS HARQ-ACK configured with SPS HARQ-ACK deferral and having a deferral duration not reaching the upper limit.

8. The terminal of claim 7, wherein the processor is configured to determine the first PUCCH resource based on the multiple SPS HARQ-ACKs.

9. The terminal of claim 7, wherein the processor is configured to call the program in the memory to cause the terminal to:

determine that the first time-domain unit is a time-domain unit for transmitting the multiple SPS HARQ-ACKs in response to the first PUCCH resource being available.

10. The terminal of claim 7, wherein a PUCCH resource is determined to be unavailable in response to at least one of:

at least one symbol corresponding to the PUCCH resource comprising a semi-static downlink symbol;

the at least one symbol corresponding to the PUCCH resource comprising a symbol carrying a synchronization signal block (SSB); or the at least one symbol corresponding to the PUCCH resource comprising a symbol carrying control resource set (CORESET) 0, wherein the PUCCH resource comprises at least one of the first PUCCH resource, a second PUCCH resource, or a third PUCCH resource.

11. The terminal of claim 7, wherein the processor is configured to call the program in the memory to cause the terminal to:

determine a second PUCCH resource in the first time-domain unit based on the first SPS HARQ-ACK set;

determine whether the first time-domain unit is the time-domain unit for transmitting the first SPS HARQ-ACK set based on whether the second PUCCH resource is available;

determine a third PUCCH resource in the first time-domain unit based on the second SPS HARQ-ACK set; and determine whether the first time-domain unit is a time-domain unit for transmitting the second SPS HARQ-ACK set based on whether the third PUCCH resource is available.

12. A network device, comprising: a memory and a processor, wherein the memory is configured to store a program, and the processor is configured to call the program in the memory to cause the network device to:

determine a first physical uplink control channel (PUCCH) resource in a first time-domain unit, the first PUCCH resource being configured for carrying multiple semi-persistent scheduling (SPS) hybrid automatic repeat reQuest acknowledgments (HARQ-ACKs), the multiple SPS HARQ-ACKs comprising at least one SPS HARQ-ACK in a first SPS HARQ-ACK set and at least one SPS HARQ-ACK in a second SPS HARQ-ACK set;

determine, in response to the first PUCCH resource being unavailable, whether the first time-domain unit is a time-domain unit for receiving the first SPS HARQ-ACK set;

determine that a terminal drops the first SPS HARQ-ACK set in response to the first time-domain unit being not the time-domain unit for receiving the first SPS HARQ-ACK set; and defer reception of the second SPS HARQ-ACK set in response to the first PUCCH resource being unavailable;

wherein the at least one SPS HARQ-ACK in the first SPS HARQ-ACK set comprises at least one of an SPS HARQ-ACK without SPS HARQ-ACK deferral, or an SPS HARQ-ACK with a deferral duration reaching an upper limit; and the at least one SPS HARQ-ACK in the second SPS HARQ-ACK set comprises an SPS HARQ-ACK configured with SPS HARQ-ACK deferral and having a deferral duration not reaching the upper limit.

13. The network device of claim 12, wherein the processor is configured to call the program in the memory to cause the network device to: determine that the first time-domain unit is a time-domain unit for receiving the multiple SPS HARQ-ACKs in response to the first PUCCH resource being available.

14. The network device of claim 12, wherein an SPS HARQ-ACK of the at least one SPS HARQ-ACK in the first SPS HARQ-ACK set and in the second SPS HARQ-ACK set is determined according to at least one of:

whether SPS HARQ-ACK deferral is configured for the SPS HARQ-ACK;

whether a terminal supports the SPS HARQ-ACK deferral; or whether a deferral duration of the SPS HARQ-ACK reaches an upper limit.

15. The network device of claim 12, wherein the processor is configured to call the program in the memory to cause the network device to:

determine a second PUCCH resource in the first time-domain unit based on the first SPS HARQ-ACK set;

determine whether the first time-domain unit is the time-domain unit for receiving the first SPS HARQ-ACK set based on whether the second PUCCH resource is available;

determine a third PUCCH resource in the first time-domain unit based on the second SPS HARQ-ACK set; and determine whether the first time-domain unit is a time-domain unit for receiving the second SPS HARQ-ACK set based on whether the third PUCCH resource is available.

* * * * *